United States Patent
Kubota

(10) Patent No.: US 10,679,600 B2
(45) Date of Patent: Jun. 9, 2020

(54) NOISE REDUCTION DEVICE AND NOISE REDUCTION SYSTEM

(71) Applicant: Panasonic Intellectual Property Management Co., Ltd., Osaka (JP)

(72) Inventor: Kenichi Kubota, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/221,459

(22) Filed: Dec. 15, 2018

(65) Prior Publication Data

US 2019/0139534 A1    May 9, 2019

Related U.S. Application Data

(63) Continuation of application No. PCT/JP2017/024830, filed on Jul. 6, 2017.

(30) Foreign Application Priority Data

Jul. 7, 2016 (JP) .................. 2016-135156

(51) Int. Cl.
| | |
|---|---|
| *G10K 11/178* | (2006.01) |
| *B60R 13/08* | (2006.01) |
| *B64C 1/40* | (2006.01) |
| *B61D 49/00* | (2006.01) |
| *H04R 3/00* | (2006.01) |
| *B64D 11/06* | (2006.01) |
| *H04R 5/02* | (2006.01) |

(52) U.S. Cl.
CPC .... *G10K 11/17813* (2018.01); *B60R 13/0815* (2013.01); *B61D 49/00* (2013.01);
(Continued)

(58) Field of Classification Search
CPC ........... G10K 11/17813; G10K 11/178; G10K 2210/128; B60R 13/0815; B61D 49/00; B64C 1/40; B64D 11/06
See application file for complete search history.

(56) References Cited

U.S. PATENT DOCUMENTS

2010/0104110 A1*  4/2010  Asao .................. B60R 13/0815
                                                    381/71.3
2010/0111317 A1   5/2010  Asao
(Continued)

FOREIGN PATENT DOCUMENTS

| JP | H01-270489 A | 10/1989 |
|---|---|---|
| JP | H03-259722 A | 11/1991 |

(Continued)

OTHER PUBLICATIONS

English machine translation of JP-2008143336A (Tanaka, Keiichiro; Vehicle Noise Control Device and Transfer Characteristic Identifying Method; published Jun. 2008).*

(Continued)

*Primary Examiner* — Mark Fischer
(74) *Attorney, Agent, or Firm* — Renner, Otto, Boisselle & Sklar, LLP

(57) ABSTRACT

With the noise reduction device (300), in identifying an acoustic transfer function that includes a path from the control speaker (340) to the error microphone (350) or the noise microphone (320) by outputting an identification sound from the control speaker (340) and detecting the identification sound with the error microphone (350) or the noise microphone (320), the identification controller (338) is configured to identify the acoustic transfer function by generating the identification sound from the white noise generator (337) when the seat detector (582) has detected that the seat is in the actual usage state for noise reduction.

3 Claims, 20 Drawing Sheets

(52) U.S. Cl.
CPC ............ *B64C 1/40* (2013.01); *B64D 11/06* (2013.01); *G10K 11/17817* (2018.01); *G10K 11/17819* (2018.01); *H04R 3/005* (2013.01); *G10K 2210/128* (2013.01); *G10K 2210/1281* (2013.01); *G10K 2210/3023* (2013.01); *G10K 2210/3035* (2013.01); *G10K 2210/3049* (2013.01); *G10K 2210/3055* (2013.01); *G10K 2210/504* (2013.01); *H04R 5/023* (2013.01); *H04R 2410/05* (2013.01)

(56) References Cited

U.S. PATENT DOCUMENTS

| | | |
|---|---|---|
| 2011/0222699 A1 | 9/2011 | Maeda |
| 2013/0208906 A1 | 8/2013 | Asao |

FOREIGN PATENT DOCUMENTS

| | | |
|---|---|---|
| JP | 2000-261880 A | 9/2000 |
| JP | 3384493 B2 | 3/2003 |
| JP | 2008-143336 A | 6/2008 |
| JP | 2011-191470 A | 9/2011 |
| JP | 2013-178471 A | 9/2013 |
| WO | 2009/078147 | 6/2009 |

OTHER PUBLICATIONS

International Search Report for corresponding App. No. PCT/JP2017/024830, dated Sep. 5, 2017.

The Supplementary European Search Report dated Jul. 18, 2019 for the related European Patent Application No. 17824327.5.

* cited by examiner

♦ bed mode broadcast : ACU_Seat_Drive
Message Type 1    Command: 208 (D0h)

| 7 | 6 | 5 | 4 | 3 | 2 | 1 | 0 |
|---|---|---|---|---|---|---|---|
| Local Address ||||| 001 |||
| Command: D0h ||||||||
| Checksum ||||||||

♦ bed mode broadcast : ACU_SeatGroup_Drive
Message Type 3    Command: 208 (D0h)

| 7 | 6 | 5 | 4 | 3 | 2 | 1 | 0 |
|---|---|---|---|---|---|---|---|
| Local Address ||||| 011 |||
| Command: D0h ||||||||
| Data Length: 01h ||||||||
| Seat Group n ||||||||
| Checksum ||||||||

♦ commence identification operation ACU_Calibration_Start (ACS)
In Type 2 LRU Command_2: ACS (41h 43h 53h)

| 7 | 6 | 5 | 4 | 3 | 2 | 1 | 0 |
|---|---|---|---|---|---|---|---|
| Local Address ||||| 000 |||
| Source Address (3 Bytes) ||||||||
| Destination Address (3 Bytes) ||||||||
| Command: F4h ||||||||
| Data Length: 03h ||||||||
| Command_2: ACS ||||||||
| Checksum ||||||||

♦ data upload instruction : ACU_Data_Request (ADQ)
In Type 2 LRU Command_2: ADQ (41h 44h 51h)

| 7 | 6 | 5 | 4 | 3 | 2 | 1 | 0 |
|---|---|---|---|---|---|---|---|
| Local Address ||||| 000 |||
| Source Address (3 Bytes) ||||||||
| Destination Address (3 Bytes) ||||||||
| Command: F4h ||||||||
| Data Length: 03h ||||||||
| Command_2: ADQ ||||||||
| Checksum ||||||||

♦ send initial value : ACU_Initial_Calibration_Data (AIC)
In Type 2 LRU Command_2: AIC (41h 49h 43h)

| 7 | 6 | 5 | 4 | 3 | 2 | 1 | 0 |
|---|---|---|---|---|---|---|---|
| Local Address ||||| 000 |||
| Source Address (3 Bytes) ||||||||
| Destination Address (3 Bytes) ||||||||
| Command: F4h ||||||||
| Data Length: N ||||||||
| Command_2: AIC ||||||||
| Initial Data ||||||||
| Checksum ||||||||

♦ identification operation complete :
ACU_Calibration_Response (ACR)
In Type 2 LRU Command_2: ACR (41h 43h 52h)

| 7 | 6 | 5 | 4 | 3 | 2 | 1 | 0 |
|---|---|---|---|---|---|---|---|
| Local Address ||||| 000 |||
| Source Address (3 Bytes) ||||||||
| Destination Address (3 Bytes) ||||||||
| Command: F4h ||||||||
| Data Length: N ||||||||
| Command_2: ACR ||||||||
| Calibration Status ||||||||
| Checksum ||||||||

♦ data upload : ACU_Data_Response (ADR)
In Type 2 LRU Command_2: ADR (41h 44h 52h)

| 7 | 6 | 5 | 4 | 3 | 2 | 1 | 0 |
|---|---|---|---|---|---|---|---|
| Local Address ||||| 000 |||
| Source Address (3 Bytes) ||||||||
| Destination Address (3 Bytes) ||||||||
| Command: F4h ||||||||
| Data Length: N ||||||||
| Command_2: ADR ||||||||
| Data in study ||||||||
| Checksum ||||||||

FIG. 24

NOISE REDUCTION DEVICE AND NOISE REDUCTION SYSTEM

TECHNICAL FIELD

The present disclosure relates to the reduction of noise in a seat, and more particularly relates to a noise reduction device and noise reduction system that are used in aircraft, railway cars, and the like.

BACKGROUND ART

When providing information such as passenger announcement or audio entertainment service to a user sitting in a seat in an aircraft, a vehicle, or the like where there is a lot of noise, ambient noise at the seat can be a problem. When using an internal space bounded by continuous walls, such as in an aircraft or a vehicle, the usage site is a kind of sealed structure, and if there are noise sources inside and outside the usage site, the noise environment ends up becoming entrenched for the user. Therefore, depending on the level of noise, the noise can become a physical and mental constraint factor to the user, making the usage site less convenient to use. In particular, when providing services to customers in the passenger compartment of an aircraft or the like, if convenience declines, this can seriously impede the quality of service business.

Especially in the case of an aircraft, the main sources of noise are those involving the noise of machinery used for generating thrust in the aircraft, such as propellers and engines, and sounds related to air flow generated by the movement of the aircraft through air layers, such as wind noise produced by the front end of the aircraft and by the wings during flight, so noise inside the aircraft is unpleasant to the passengers, and also hinders voice announcements and the like, so improvement is strongly desired.

The usual way to reduce noise in a sealed compartment has conventionally involved a method that relies on passive attenuation, and a sound insulation material that is acoustically absorbent, such as a barrier material or an absorbent material, is disposed between the sealed structure and the noise source. A high-density barrier material or the like is used as a barrier material, and a sound deadening sheet or the like is used as an absorbent material. Materials that are acoustically absorbent generally have higher density, and high-density materials lead to increased weight. As the weight increases, fuel consumption increases and the cruising distance decreases. Therefore, this diminishes the economic efficiency and functionality of the aircraft. Also, if used as a structural material, the deterioration of function in terms of strength (prone to scratching, etc.) and design (texture and the like) cannot be ignored.

To solve the problem encountered with noise countermeasures involving the above-mentioned passive attenuation section, a method in which a sound wave having a phase opposite to the phase of the noise is generated has generally been employed in the past as a way to reduce noise with an active attenuation section. This method reduces the noise level at or near the source and prevents the noise from propagating to areas where noise reduction is required. A specific application example that has been proposed is a noise reduction device comprising a microphone that picks up sound generated from a noise source, a controller that amplifies the electric signal inputted from the microphone and inverts the phase, and a speaker that converts the electric signal inputted from the controller into sound and transmits this sound (see Patent Literature 1, for example).

Also, in order to design an active noise reduction device, it is necessary first to find the acoustic transfer function from the speaker to the noise control point. To this end, it is common to generate white noise having flat frequency characteristics in the control frequency band from a speaker, pick up this white noise with a microphone provided at the control point, and measure the transfer function thereof. A method has been proposed in which the external noise level is measured and white noise that is higher than the external noise level by a specific amount (such as 10 dB) is generated in order to avoid the influence of external noise (see Patent Literature 2, for example).

CITATION LIST

Patent Literature

Patent Literature 1: JP-A H1-270489
Patent Literature 2: JP-A H3-259722

SUMMARY

Technical Problem

However, the technique disclosed in Patent Literature 2 is a method in which the acoustic transfer function from a speaker to a microphone provided at a control point is measured when a single noise reduction device is installed, and there is no mention of installing a plurality of noise reduction devices. In particular, when a noise reduction device is installed in each seat of an aircraft or the like, the number of noise reduction devices for which an acoustic transfer function must be found will be the same as the number of seats. In such a case, how to measure the acoustic transfer function of each noise reduction device quickly and accurately, without its being affected by external noise, is the question.

It is an object of the present disclosure to solve the above problem and to provide a noise reduction device and a noise reduction system with which an acoustic transfer function can be accurately and quickly calculated without being influenced by external noises by putting each seat to the actual usage state, and a self-check of the various functions of the noise reduction devices can be carried out.

In addition, when each seat in an aircraft is driven from the outside to its actual usage state, if there is a person in the seat, there is a risk of causing a safety problem by accidental drive.

In view of this, the present disclosure provides a noise reduction device and a noise reduction system with which a seat can be driven from the outside to its actual usage state while safety is ensured during maintenance.

Solution to Problem

In order to solve the above problem, the noise reduction device disclosed herein comprises a noise detection section for detecting noise, a noise control section for generating a control sound signal for reducing the noise detected by the noise detection section at the control center of a control space, a control sound output section for outputting a control sound on the basis of the control sound signal from the noise control section, an error sound detection section for detecting an error sound by superimposing the noise at the control center with the control sound outputted from the control sound output section, and a seat detection section for detecting that a seat is in its actual usage state in the position where noise reduction will actually be used, wherein a system management device notifies to drive a seat to its actual usage state, the noise control section has an identification sound generation section and an identification control section, and in identifying an acoustic transfer function that includes the path from the control sound output section to the error sound detection section or the noise detection section by outputting an identification sound from the control sound output section and detecting the identification sound with the error sound detection section or the noise detection section, the identification control section identifies the acoustic transfer function by generating the identification sound from the identification sound generation section when the seat detection section has detected that a seat is in its actual usage state for noise reduction.

With this configuration, it is possible to accurately identify the acoustic transfer function by putting a seat into its actual usage state. For example, when the control sound output section and the noise detection section or the error sound detection section are installed in a seat in order to effectively reduce noise when a passenger lies on the seat in the bed mode position in which the backrest of the seat has been reclined all the way back, that is, when the actual usage state of the seat is bed mode, the identification operation of the noise reduction device can be commenced after the seat is driven into bed mode. Therefore, an identification operation is possible for properly deriving a very accurate acoustic transfer function with respect to an acoustic space in which noise reduction is performed by the sound output section and the sound detection section, which are surrounded by the seat mechanism and wall materials in the seat.

In addition, with the noise reduction device disclosed herein, a self-check of the constituent functions may be performed prior to calculation of the acoustic transfer function.

The sound input/output function (such as a speaker and a microphone) referred to here needs to check the sound pressure sensitivity and frequency characteristics.

The noise reduction device disclosed herein is connected to a speaker and a microphone attached to the seat, and self-checks these acoustic functions.

This makes possible an identification operation in which an accurate acoustic transfer function is accurately calculated.

Also, with the noise reduction device disclosed herein, the seat detection section may detect that no one is in the seat. Alternatively, it may detect a situation in which it will not be unsafe to drive the seat from the outside, such as during maintenance when there are no passengers.

With this configuration, it is possible to prevent any anxiety that could arise if the seat is driven without the intention of a person in the seat.

Also, with the noise reduction device disclosed herein, the identification controller may commence the identification operation in a state in which there is no external drive noise after the seat detection section has detected that the seat has finished being driven. Alternatively, the identifying operation may be commenced after the sound of the seat being driven as detected by the sound detection section drops below the level at which the sound becomes external noise. With this configuration, the identification operation can be performed without being affected by the drive noise of the seat becoming external noise. The sound of a seat being driven may be presumed to come not only from that seat but also from adjacent seats.

Also, with the noise reduction device disclosed herein, the time it takes to output an identification sound from the control sound output section may be shorter than the time required for an identification operation. For example, if it takes one second to emit an identification sound, a one-second sound inputted to the error sound detection section is repeatedly used for ten seconds to perform an identification operation, the result being that the identification sound of an adjacent noise reduction device that becomes external noise is shortened from ten seconds to one second. Consequently, identification operations of numerous noise reduction devices can be performed simultaneously and without being affected by identification sounds from other noise reduction devices during the identification operation, which section that an identification operation can be executed accurately and quickly.

The noise reduction system disclosed herein comprises a plurality of noise reduction devices and a system management device that manages whether or not the noise reduction devices have executed the identification of an acoustic transfer function, wherein the system management device notifies to drive a seat having a noise reduction device and put it in its actual usage state, starts the identification of the noise reduction devices included in the noise reduction system, and registers in the system management device that identification has been executed.

With this configuration, the identification operation of many noise reduction devices can be performed at the same time without being influenced by identification sounds from other noise reduction devices during the identification operation, so the identification operation can be executed accurately and quickly.

Also, with the noise reduction system disclosed herein, it may be detected that maintenance is in progress when no passenger is sitting in a seat.

For instance, during maintenance in which the various onboard devices and functions are inspected before passengers board the aircraft, there is no worry that a seat will be unintentionally driven from the outside of the seat and a person will be caught in the seat or have his posture changed.

Furthermore, any such anxiety can be reliably prevented if it is detected that no one is in a seat.

Also, when the system management apparatus is connected to the onboard system, a notification may be given that maintenance is in progress.

Also, with the noise reduction system disclosed herein, the system management device may notify the noise reduction device of the coefficient initial value of the acoustic transfer function. The coefficient initial value of the acoustic transfer function is obtained by data used in another noise reduction system from the noise reduction device and is putt in the system management device, and is then applied to that noise reduction system. In this case, the system management device is characterized by notifying the noise reduction device to collect actual noise data and coefficient data for the acoustic transfer function, and extracting this data. Alternatively, the acoustic space in which the seat mechanism and wall materials in the seat, the sound output section, and the sound detection section are disposed may be simulated, and the data derived by computer simulation.

With this configuration, the noise reduction device can use a more plausible coefficient initial value in an identification operation to converge and derive the acoustic transfer function accurately and in a short time, and the noise reduction system can complete identification operations with a large number of noise reduction devices in less time.

Also, in an adaptive operation in which noise reduction is performed on ambient noise, more plausible adaptive filtering can be applied, and the noise reduction effect can be enhanced.

Also, with the noise reduction system disclosed herein, the system management device may subject the coefficient initial values for the acoustic transfer function to data compression and send the result to the noise reduction device. The same applies in the opposite direction, and the noise reduction device may subject the coefficient initial values for the acoustic transfer function to data compression and send the result to system management device. For example, with seats disposed in front of and behind each other, the coefficient values are usually similar, so difference data for the coefficient values of the acoustic transfer function of those seats is derived from the coefficient values serving as a base with respect to a plurality of nearby seats. Rather than transmitting data from multiple noise reduction devices for each individual seat, transmitting just the difference data to individual seats after sharing the base coefficient values reduces the amount of data to be transmitted, that is, allows the data to be compressed, so the time it takes noise reduction system to execute an identification operation can be shortened. Also, since the data transmitted to the system management apparatus can be compressed and data storage capacity can be reduced, man-hours of data storage and equipment costs can be reduced.

Also, with the noise reduction system disclosed herein, a noise reduction device may be installed in each seat of an aircraft.

Advantageous Effects

With the present disclosure, a seat can be put in its actual usage state, the acoustic transfer function can be calculated accurately and quickly without being affected by external noise, the self-testing of the functions constituting the system can be carried out, and these can be carried out safely during maintenance. This makes it possible to provide a noise reduction device and a noise reduction system that maximize the noise reduction effect.

BRIEF DESCRIPTION OF DRAWINGS

FIG. 24 is a structure diagram of commands transmitted between devices in this system.

DESCRIPTION OF EMBODIMENTS

Embodiments of the present disclosure will now be described through reference to FIGS. 1 to 24.

Embodiment 1

A noise reduction device in an embodiment of the present disclosure will now be described by citing a case in which the device is mounted in an aircraft. First, the acoustic environment in the aircraft requiring installation of noise reduction devices will be described through reference to FIGS. 1 and 2.

Figure 1:
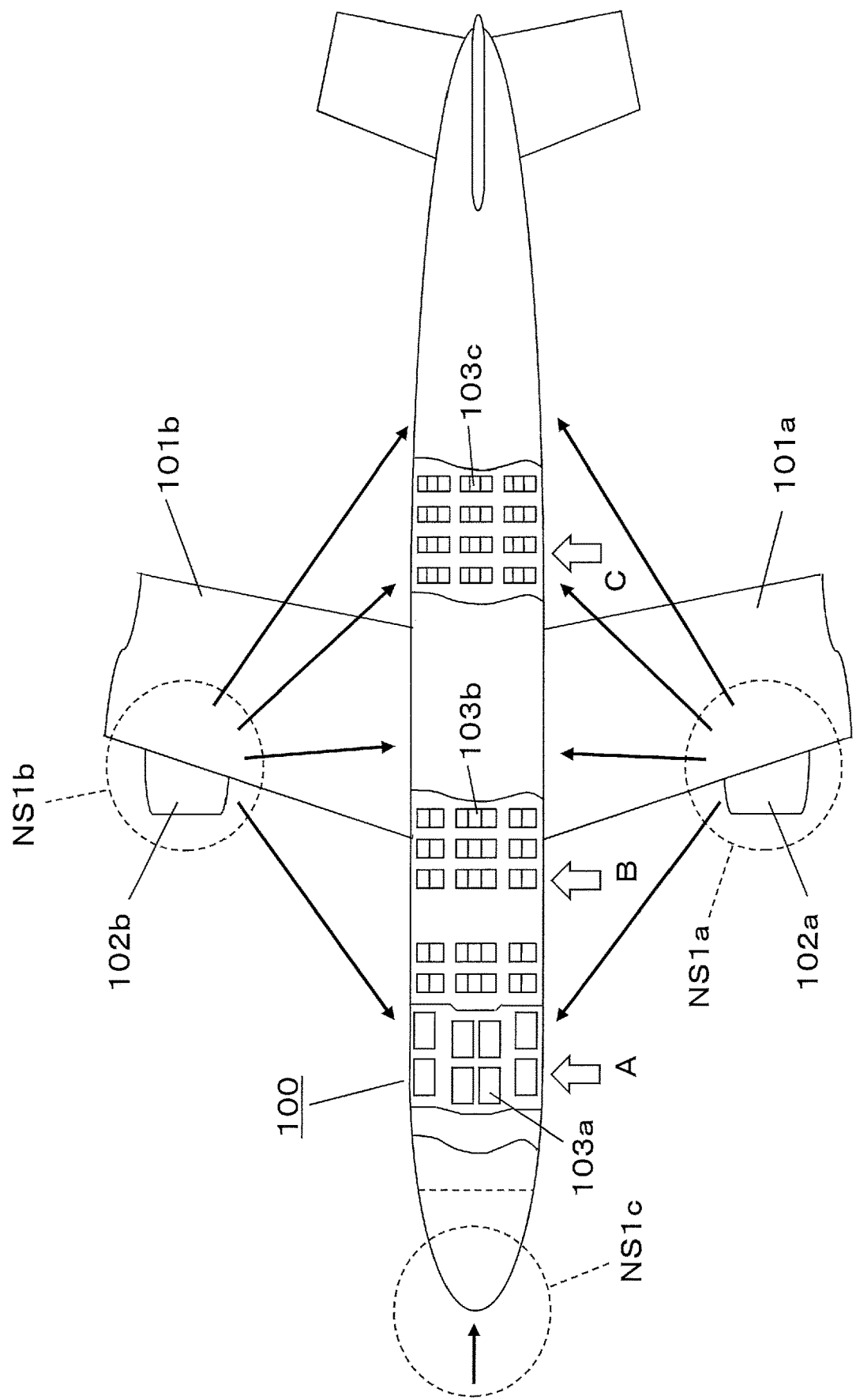
FIG. 1 is a plan view showing the installation environment of noise reduction devices in an embodiment of the present disclosure.

FIG. 1 is a plan view showing the installation environment of noise reduction devices in an embodiment of the present disclosure. As shown in FIG. 1, an aircraft 100 comprises engines 102*a* and 102*b* on left and right wings.

From the standpoint of the acoustic environment of an aircraft, the engines play a major role as a source of noise not only because of their running noise, but also because of reverberations of air flow during the flight and so forth. From the standpoint of passenger service, the engines 102*a* and 102b are external noise sources NS1a and NS1b that affect parts of the aircraft located at seat rows 103a, 103b, and 103c installed in a cabin A (such as first class), a cabin B (such as business class), and a cabin C (such as economy class) of the aircraft. In addition, when the aircraft moves at high speed through the air layer, the sound produced when the front end of the aircraft and its the wings collide with (cut through) the air flow becomes a noise source NS1c that adversely affects the provision of information and so forth inside the aircraft.

Figure 2:
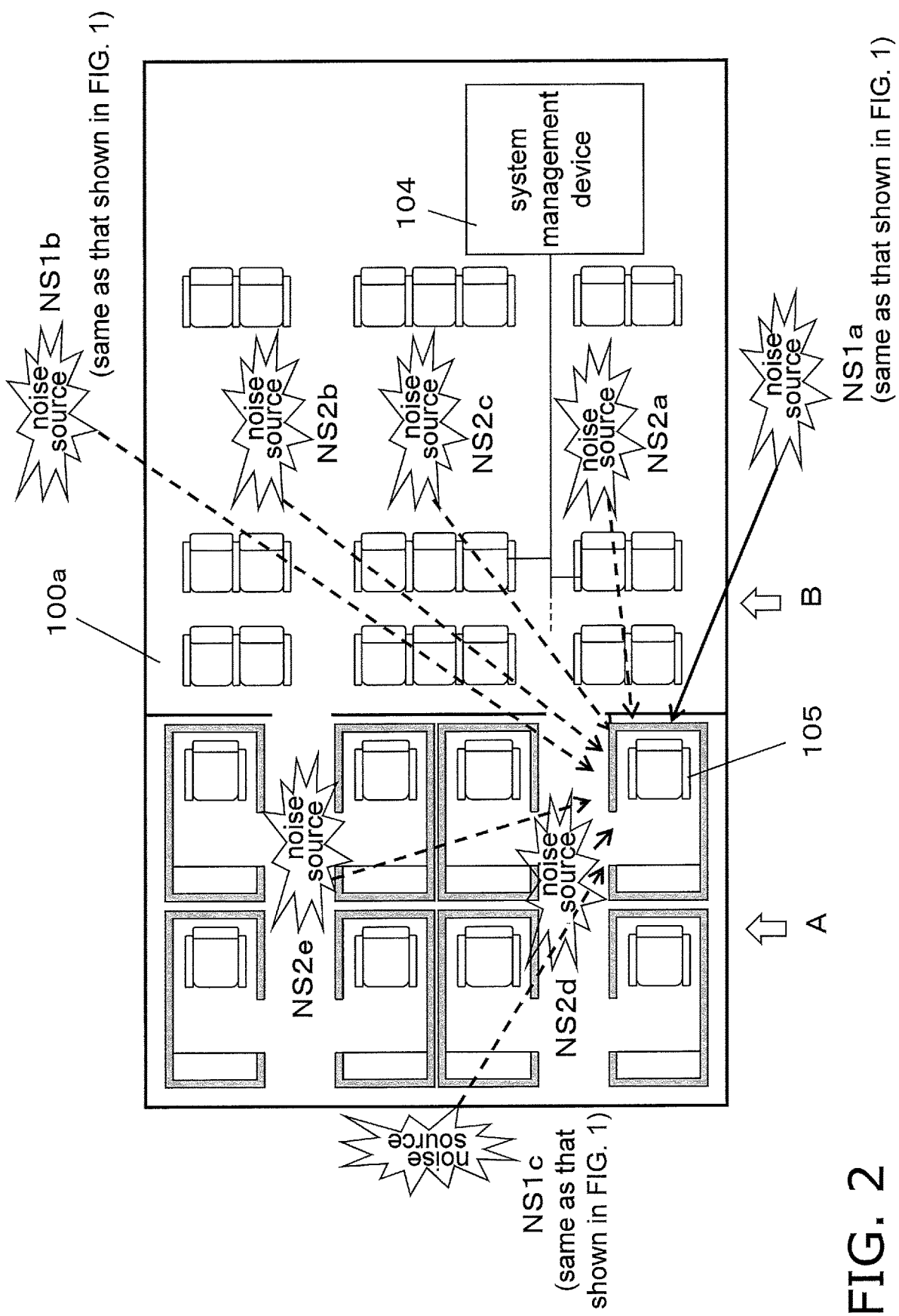
FIG. 2 is a plan view showing in detail the installation environment of these devices.

FIG. 2 is a plan view showing in detail the environment in which the noise reduction devices are installed, and gives a detail view of the layout of seats in part of cabins A and B in FIG. 1.

The cabin 100a is divided into cabins A and B by a wall. Further, entertainment equipment and the like are installed in each seat row and are connected to a system management device 104 equipped with a switching device, a data management server, etc., via a communication line such as Ethernet (registered trademark).

Meanwhile, as to the acoustic environment of the cabin 100a, there are noise sources NS1a and NS1b generated from the engines 102a and 102b and a noise source NS1c, which is wind noise at the front part of the aircraft, as external noise sources, as well as noise sources NS2a to NS2e produced by air conditioning and so forth, as internal noise sources.

If we consider this as noise at one seat 105 located in the cabin A, then the seat 105 is affected by noise from the engine 102a attached to the wing outside the window (FIG. 1), the noise sources NS1a to NS1c that are caused by air flow sound, and the noise sources NS2a to NS2e that are caused by air conditioning.

For example, in the cabin A at seat 105, we can predict a situation in which the noise from the noise source NS1a produced by the engine mounted on the left wing (FIG. 1) is the loudest of all the noise arriving from the noise sources NS1a to NS1c and the noise sources NS2a to NS2e. Therefore, in order to effectively reduce the noise at each seat, it is necessary to put emphasis on the noise that is the loudest and has the most detrimental effect on the acoustic environment of the seat, out of the various noises emitted from each direction.

In particular, in the first class section indicated by the cabin A in FIG. 1, the seats have a shell structure, and the inside of the shell is provided with an entertainment device such as a television or a radio for enjoying movies or music, a writing desk, a PC connection power supply, and so forth for business man, and there is strong demand to provide passengers with an environment where they can relax and concentrate on their business at their leisure. Therefore, there is a particularly great need for noise reduction inside this shell.

Figure 3:
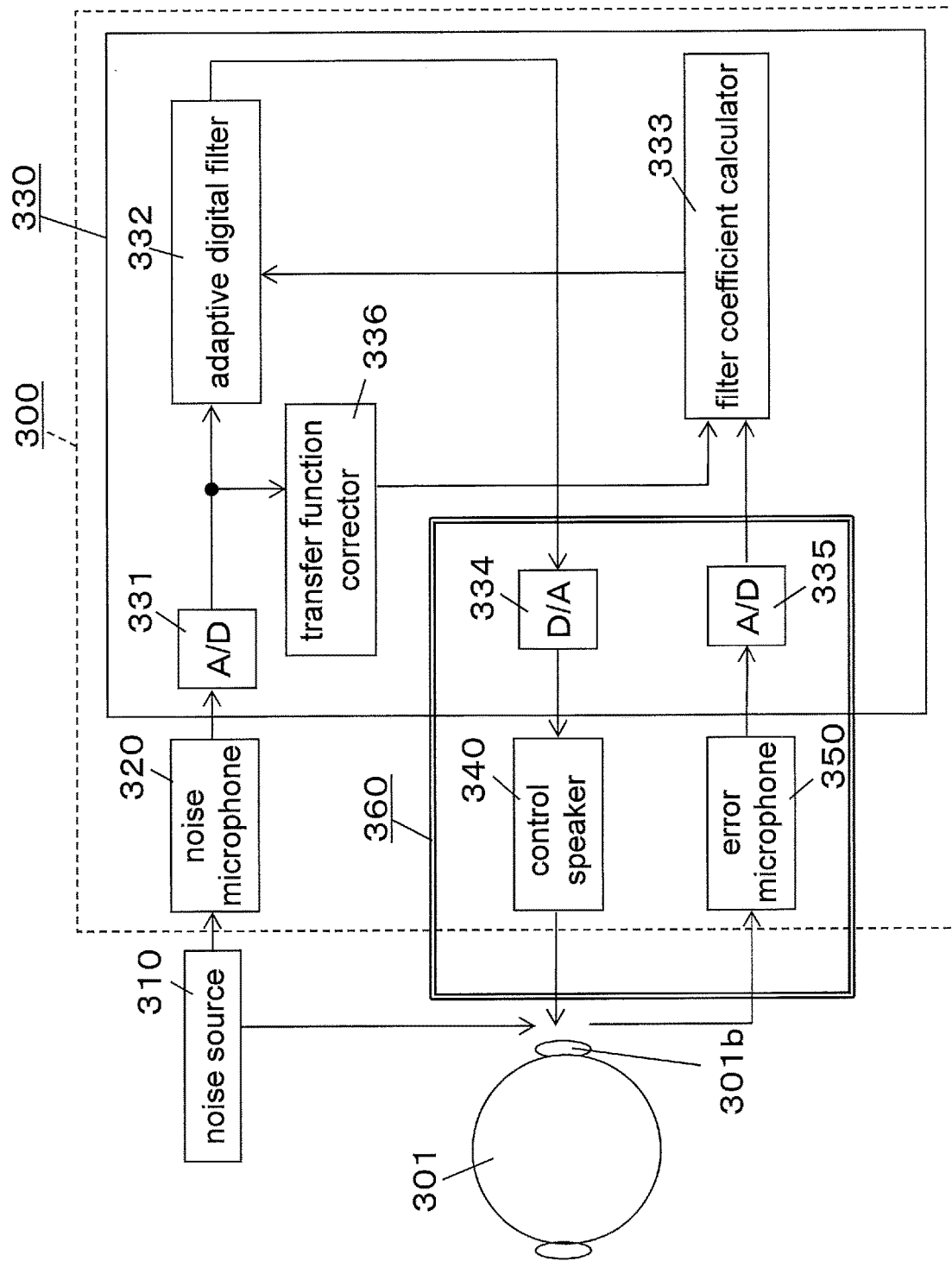
FIG. 3 is a block diagram of the basic configuration of an adaptive operation of the device.

FIG. 3 is a block diagram of the basic configuration of an adaptive operation (details will be described below) of the noise reduction device in an embodiment of the present disclosure. A noise reduction device 300 comprises a noise microphone 320, a noise controller 330, a control speaker 340, and an error microphone 350. The range 360 bounded by the double line indicates the range of the transfer function.

Configurations and functions will be described below. The noise microphone 320 is provided as a noise detection section for detecting noise emitted from the noise source 310, and its function is to detect noise information, converting it into an electric signal, and output that signal.

The noise controller 330 (serving as a noise control section) is provided with A/D converters 331 and 335, an adaptive digital filter 332, a filter coefficient calculator 333, and a D/A converter 334, and generates a control sound signal such that the detection error is minimized, on the basis of the noise information from the noise microphone 320 and the error information from the error microphone 350.

The control speaker 340 (serving as a control sound output section) has the function of converting the control sound signal received from the D/A converter 334 into sound waves and outputting them, and of emitting a control sound that cancels out noise near the ear 301b of the user 301.

The function of the error microphone 350 is to detect a residual sound (error sound) produced by superimposing the noise emitted from the noise source 310 over the control sound emitted from the control speaker 340, converting the result into an electric signal, and outputting this signal.

The adaptive digital filter 332 is constituted by a multi-stage tap, and is an FIR filter that allows the filter coefficient of each tap to be freely set. In addition to the information from the noise microphone 320, a detection error signal from the error microphone 350 is inputted to the filter coefficient calculator 333 via the A/D converter 335, and each filter coefficient of the adaptive digital filter 332 is adjusted so as to minimize this detection error.

That is, a control sound signal having a phase opposite to that of the noise from the noise source 310 is generated at the installation position of the error microphone 350, and this is outputted through the D/A converter 334 to the control speaker 340.

A transfer function corrector 336 is an FIR filter with a multi-stage tap, which expresses a transfer function within the range 360 of the transfer function. That is, it expresses the transfer function up to when the output of the adaptive digital filter 332 goes through the D/A converter 334 and the control speaker 340 to generate a control sound, and that control sound goes through the error microphone 350 and the A/D converter 335 and reaches the filter coefficient calculator 333.

The A/D converter 331 subjects the noise signal from the noise microphone 320 to A/D conversion and outputs it through the adaptive digital filter 332 and the transfer function correction unit 336 to the filter coefficient calculator 333. Because it passes through the transfer function corrector 336, the output of the adaptive digital filter 332 can take into account transfer characteristics such as delay and reflection in the error sound signal that has undergone A/D conversion and is inputted to the filter coefficient calculator 333, and a more accurate filter coefficient can be calculated.

The error microphone 350 (serving as an error sound detection section) detects sound that has undergone noise reduction as an error, and performs feedback with respect to the operation result of the noise reduction device 300. Consequently, even if there is a change in the noise environment or the like, noise can always be minimized at the user's ear position.

As shown in FIG. 3, with the noise reduction device 300 in an embodiment of the present disclosure, the noise emitted from the noise source 310 is detected by the noise microphone 320, signal processing is performed by the noise controller 330 to output a control sound from the control speaker 340, and the noise emitted from the noise source 310 is superimposed over a sound whose phase is inverted and transmitted to the ear 301b of the user 301, thereby performing noise reduction. This is called an adaptive operation.

Figure 4:
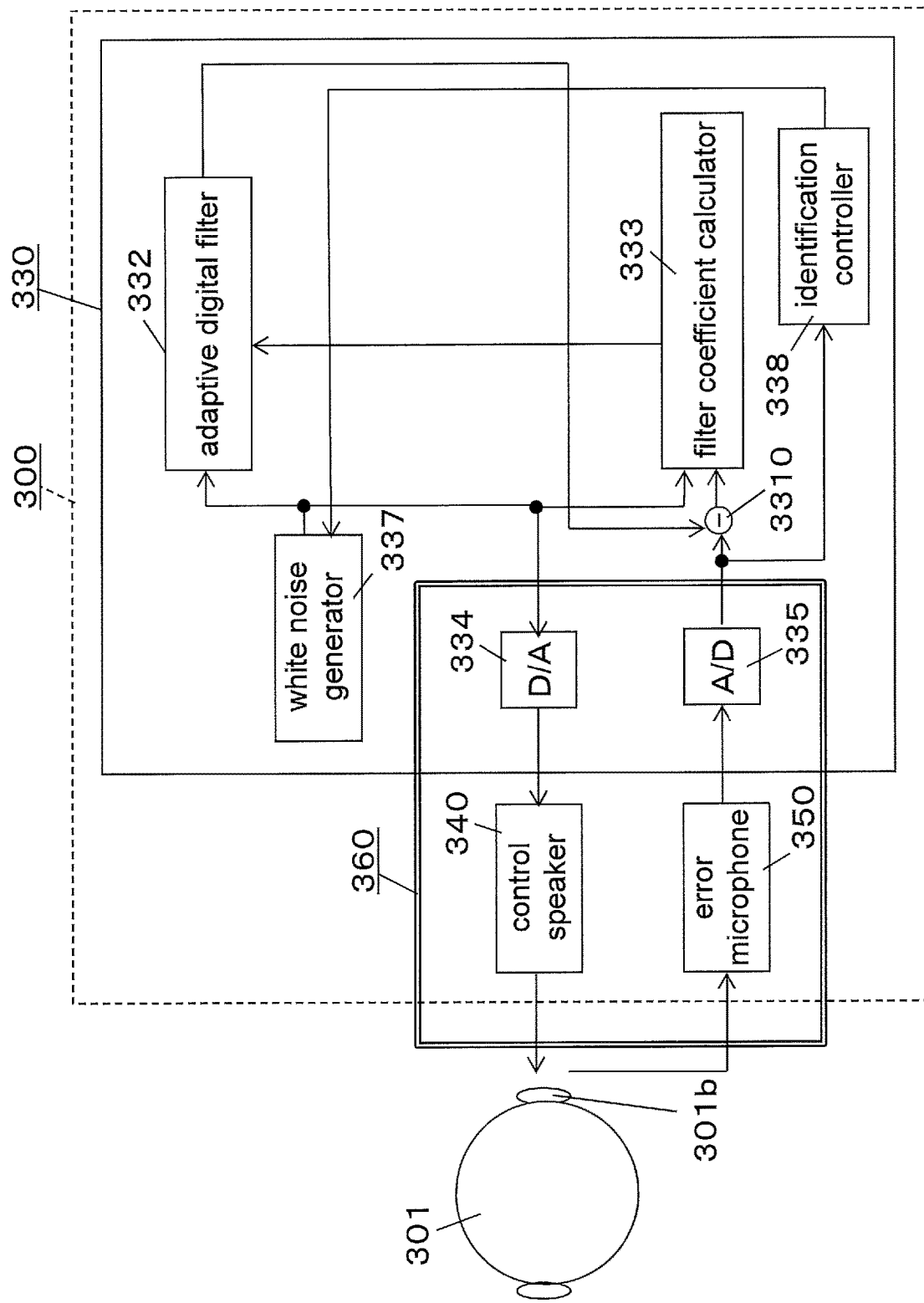
FIG. 4 is a block diagram of the basic configuration for performing an identification operation with the device.

Next, the method for finding the transfer function in the transfer function range 360 will be discussed. This work of finding the transfer function is called an identification operation, with respect to the adaptation operation of FIG. 3. FIG. 4 is a block diagram of the basic configuration for performing an identification operation with the noise reduction device 300 in an embodiment of the present disclosure. Here, an example will be described of using white noise as the identification sound to be used for identification.

In an identification operation, a white noise generator 337 (serving as an identification sound generation section) and an identification controller 338 that controls the white noise generator 337 are used in the noise controller 330. The adaptive digital filter 332, the filter coefficient calculator 333, the D/A converter 334, the A/D converter 335, the control speaker 340, and the error microphone 350 can be constituted by the same components as in FIG. 3. In an identification operation, the transfer function of the range 360 is found, so it is particularly desirable for the components in the range 360 to be the same as those in FIG. 3.

During the identification operation, the noise controller 330 outputs the output of the white noise generator 337 through the D/A converter 334. Here, the difference between the signal obtained by A/D conversion of the input from the error microphone 350 and the output of the adaptive digital filter 332 is found by a differentiator 3310, this difference is called an identification difference signal, and the identification difference signal and the output of the white noise generator 337 are inputted to the filter coefficient calculator 333. The filter coefficient calculator 333 calculates a filter coefficient so as to minimize the identification differential signal, and changes the coefficient of the adaptive digital filter 332. This operation allows an FIR filter expressing the transfer function of the transfer function range 360 to be calculated.

In FIG. 3, the noise emitted from the noise source 310 enters the error microphone 350, but in the identification operation, in order to calculate the FIR filter of the transfer function corrector 336 accurately, It is preferable that the noise level entering the error microphone 350 is lower than the level at which the output from the control speaker 340 for white noise is input to the error microphone.

In an environment where a plurality of noise reduction devices are installed, if white noise generated during an identification operation by another noise reduction device is inputted to the error microphone 350, this can result in poor accuracy of the FIR filter of the transfer function corrector 336. Therefore, the identification controller 338 determines whether or not white noise due to the identification operation of an adjacent noise reduction device is being inputted to the error microphone, based on the data that has been inputted to the error microphone 350 and undergone A/D conversion.

If it is determined that white noise from a neighboring noise reduction device is not being inputted to the error microphone, the white noise generator 337 is controlled to generate white noise and the identification operation is begun. This prevents deterioration of the accuracy of the FIR filter of the transfer function corrector 336.

Figure 5:
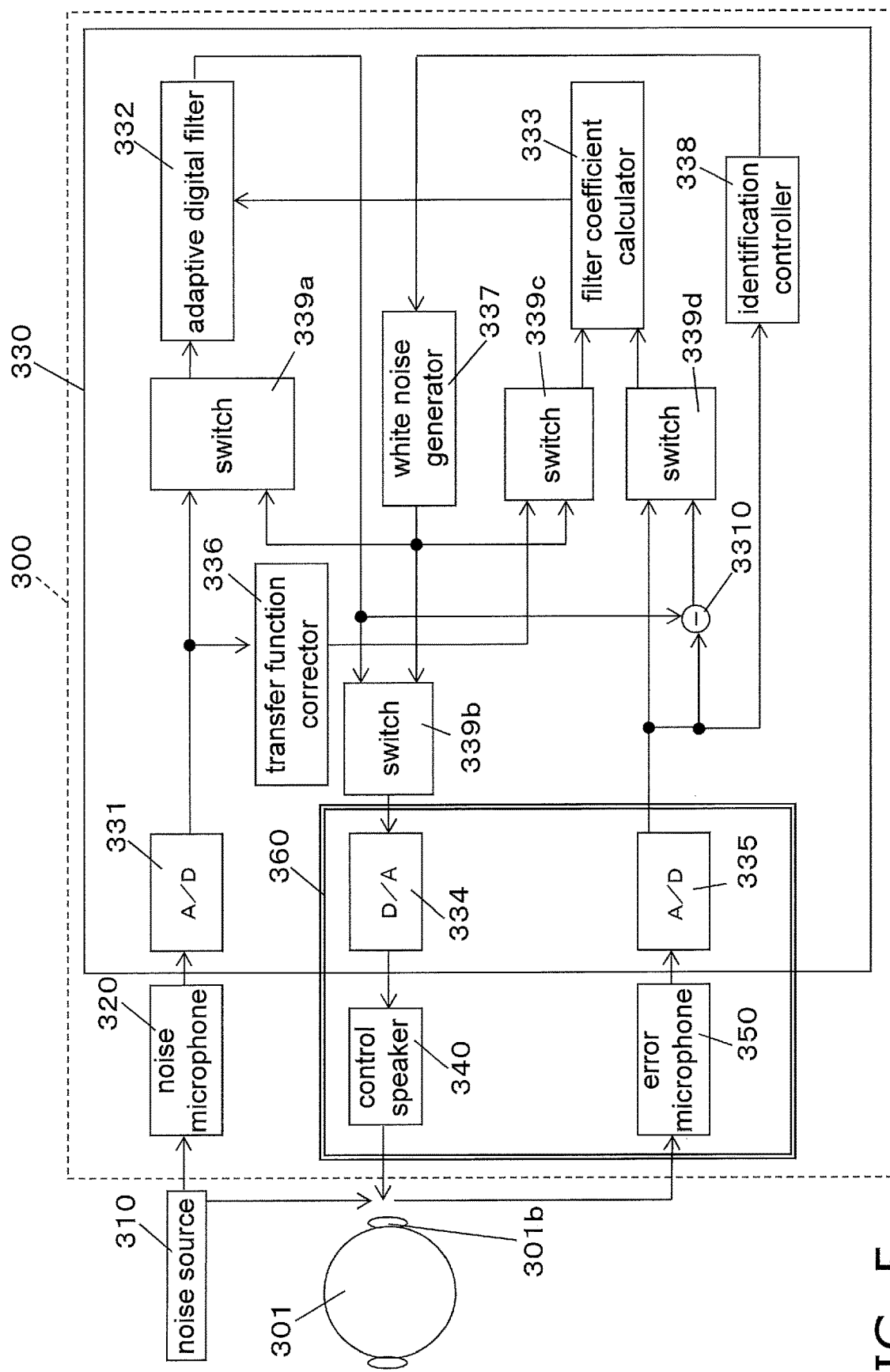
FIG. 5 is a block diagram of a configuration that allows for switching between adaptive operation and identification operation with the device.
Figure 6:
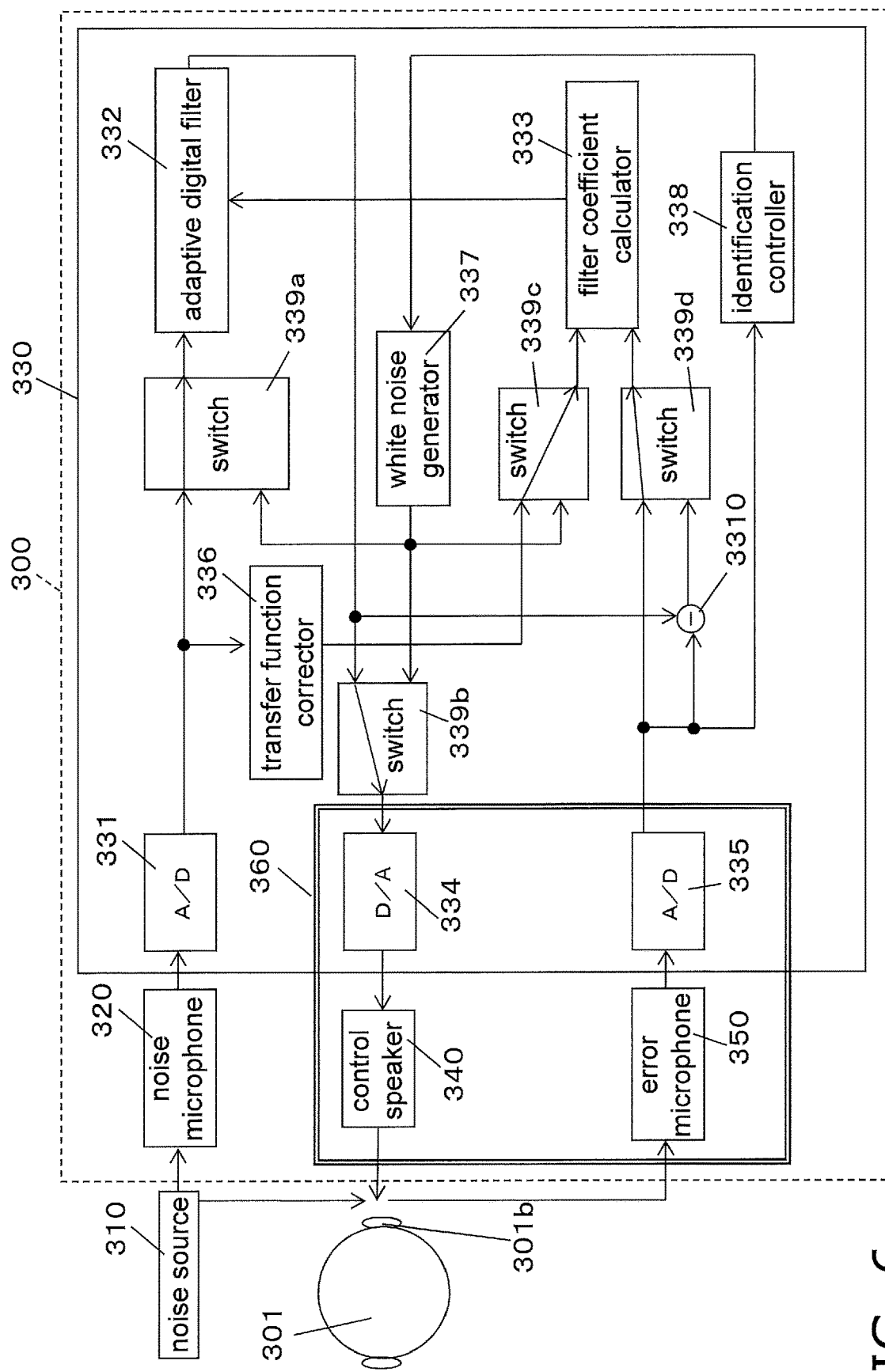
FIG. 6 is a diagram illustrating switching during adaptive operation with the device.
Figure 7:
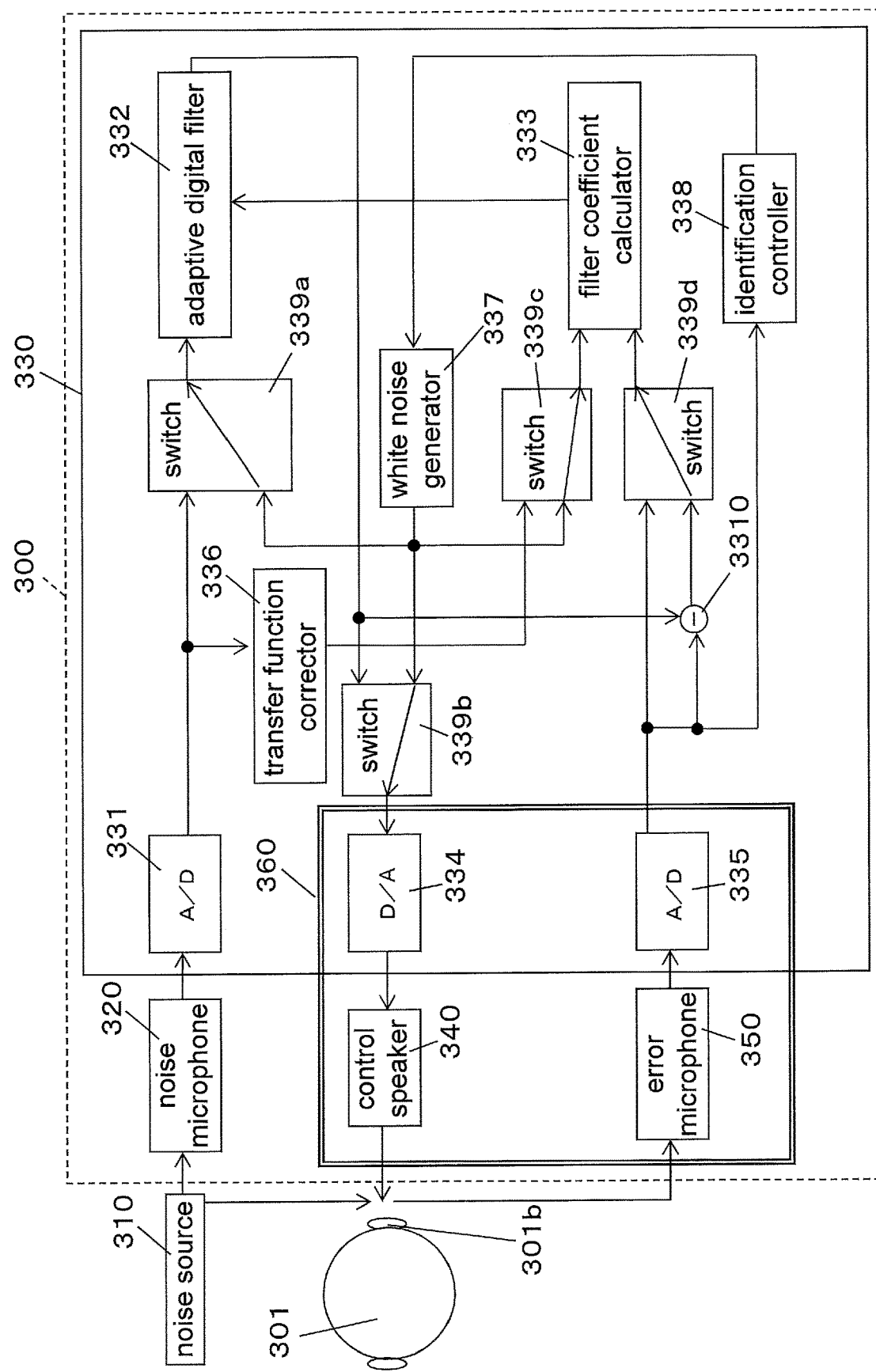
FIG. 7 is a diagram illustrating switching during identification operation with the device.

The adaptive operation in FIG. 3 and the identification operation in FIG. 4 can be realized by the same components by inserting switches 339a to 339d as shown in FIG. 5 and switching between adaptive operation and identification operation. If the switches 339a to 339d are switched as shown in FIG. 6, the configuration is the same as in FIG. 3 and adaptive operation can be performed. If the switches 339a to 339d are switched as in FIG. 7, the configuration is the same as in FIG. 4 and the identification operation is performed.

Figure 8:
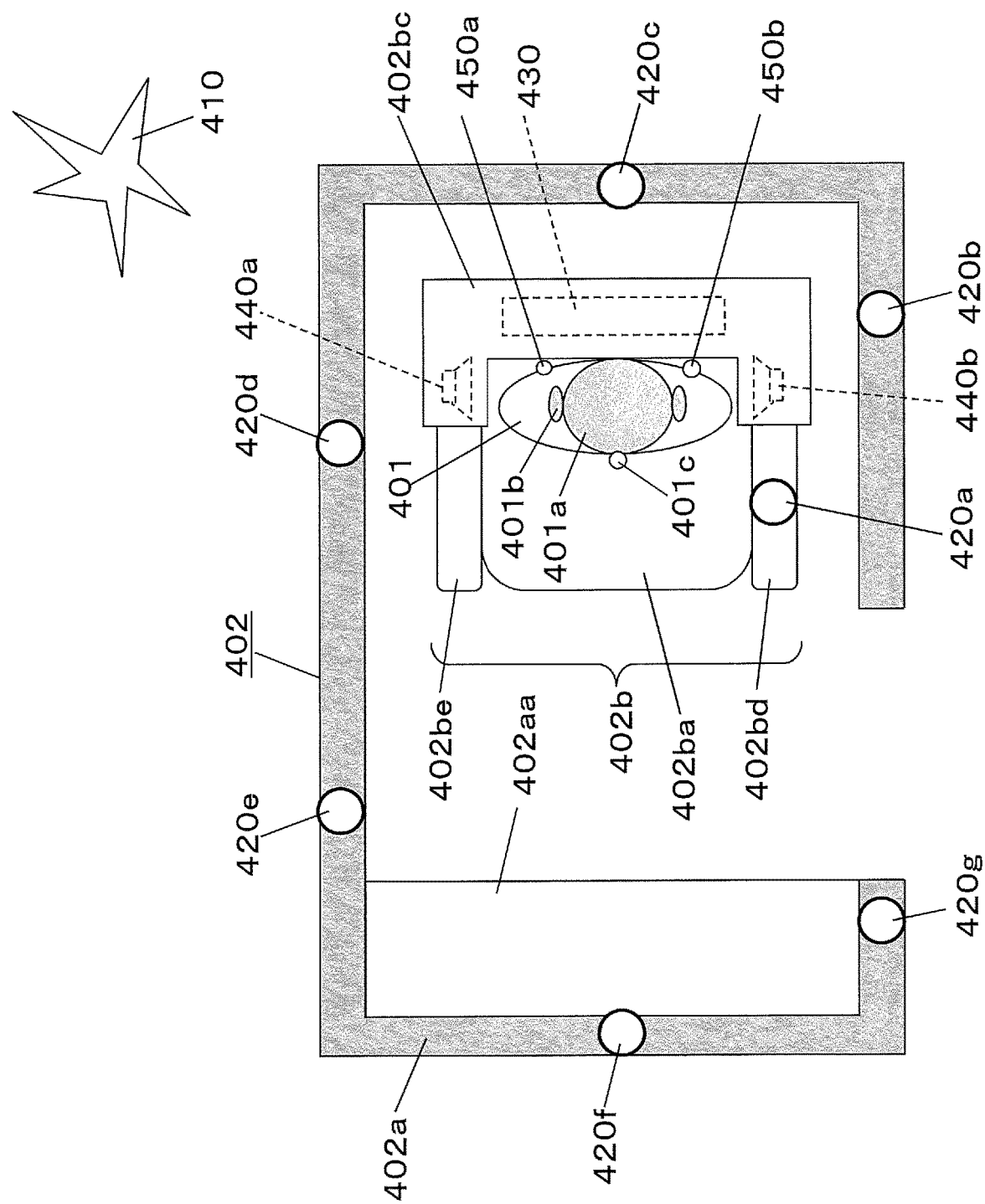
FIG. 8 is a plan view of the main components when the device is installed in the cabin of an aircraft.

Next, a situation in which the noise reduction device in an embodiment of the present disclosure is installed in the cabin of an aircraft will be described through reference to FIG. 8. FIG. 8 is a plan view of the main components of a noise reduction device installed in the cabin of an aircraft.

As shown in FIG. 8, the noise reduction device is installed in a seat 402, which is located in the cabin A of the aircraft (FIG. 1), and which is a control space in which noise is controlled.

The seat 402 comprises a shell portion 402a that surrounds the periphery with a shell-shaped wall surface to ensure a user's occupied area, and a seat portion 402b that is disposed inside the shell portion 402a. The shell portion 402a comprises a shelf portion 402aa at a position facing the front side of the seat portion 402b, which can function as a desk. Also, the seat portion 402b comprises a backrest portion (not shown), a headrest 402bc, and armrest portions 402bd and 402be.

The acoustic environment in the cabin A of the aircraft includes noise sources such as the engines mounted on the aircraft, an air conditioner installed inside the cabin, and so forth, and at the seat 402, the noise emitted from these noise sources reaches the outer peripheral part of the shell portion 402a.

With a noise reduction device, the control center is defined such that the inside of the shell portion 402a shown in FIG. 8 is the control space of the seat 402, and the position of the head 401a of the user 401 seated in the seat portion 402b is the center of this control space.

In FIG. 8, at the seat 402, for example, physical sound deadening is performed around the seat 402 by the shell portion 402a against the noise emitted from the external noise source 410. The noise from the noise source 410 goes into the interior of the shell portion 402a and reaches the head 401a (control center) of the user 401 sitting in the seat portion 402b.

When there are various noise sources, such as aircraft noise, and a main noise path cannot be identified, a plurality of omnidirectional noise microphones are installed in the shell section 402a (control space) or in the vicinity thereof.

FIG. 8 shows a situation in which noise microphones 420a to 420g (corresponding to the noise microphone 320 in FIG. 3) are arranged at specific positions of the shell portion 402a, and control speakers 440a and 440b (corresponding to the control speaker 340 in FIG. 3) and error microphones 450a and 450b (corresponding to the error microphone 350 in FIG. 3) are arranged in the seat.

In this case, since there are two control speakers and two error microphones, the identification operation shown in FIG. 4 is performed for each. For example, white noise is outputted from the control speaker 440a, a filter coefficient is calculated using an identification error signal on the basis of the signals observed with each of the error microphones 450a and 450b, and after that, white noise is outputted from the control speaker 440b and a filter coefficient (transfer function) is calculated in the same manner. Therefore, in this case there are four transfer functions.

Figure 9:
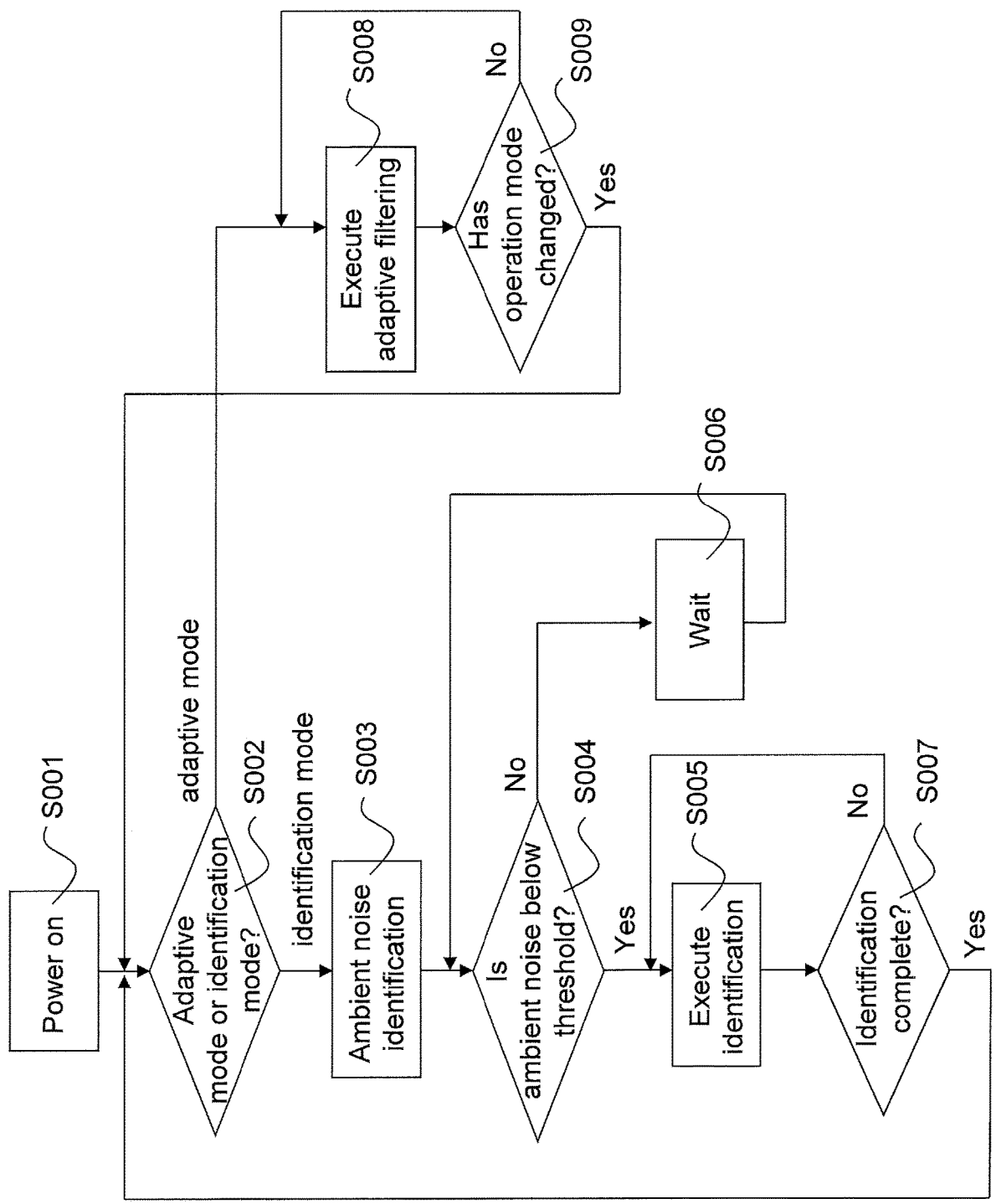
FIG. 9 is a flowchart illustrating an example of the operation of the device.

FIG. 9 is a flowchart illustrating an operation example of the noise reduction device in an embodiment of the present disclosure. Each step will be described below.

When the power of the noise reduction device is turned on, the flow proceeds from step S001 to step S002.

In step S002, either adaptive mode or identification mode is selected. With this selection method, for example, identification mode may be automatically selected at initial startup, or the user may select either adaptive mode or identification mode with a switch or the like. The term "adaptive mode" indicates an adaptive operation, and "identification mode" indicates an identification operation.

When identification mode is selected, ambient noise is measured in step S003 and the flow proceeds to step S004. In step S004, it is determined whether or not the ambient noise is below a threshold with respect to a predetermined noise level.

For example, in FIG. 4, the identification controller 338 can determine the threshold based on the error sound that has undergone A/D conversion by the error microphone 350.

If the ambient noise is below the threshold, white noise is generated and identification is executed in step S005. When identification is executed, steps S005 and S007 are repeated until the identification is completed.

If the ambient noise is above the threshold in step S004, the flow returns to step S004 after waiting for a certain amount of time in step S006, and it is again determined whether the ambient noise is below the threshold.

The waiting time in step S006 is set, for example, to the length of time that the noise reduction device generates white noise. Setting the waiting time to the duration that white noise is generated, it is possible to prevent influence on the other noise reduction device which started identification after the identification is started until the end of the identification and has already started identification.

When adaptive mode is selected in step S002, adaptive filtering is executed in step S008, the change in the operation mode is monitored in step S009, and the execution of the adaptive filtering is repeated as long as the operation mode does not change.

When the operation mode changes to identification mode, the flow returns to step S002 and then proceeds to step S003.

Here, the execution of adaptive filtering section calculating the optimum filter coefficient with the filter coefficient calculator 333, setting this filter coefficient in the adaptive digital filter 332, and executing an adaptive filtering operation.

With this operation, in an environment in which a plurality of noise reduction devices are installed, white noise generated during an identification operation by other noise reduction devices is inputted to the error microphone 350, which prevents a drop in the accuracy of the FIR filtering of the transfer function corrector 336. Also, it is possible to perform the identification operation at the same time for any noise reduction devices in which white noise produced by the identification operation of other noise reduction devices is below the threshold, which section that identification operation will take less time.

Embodiment 2

Figure 10:
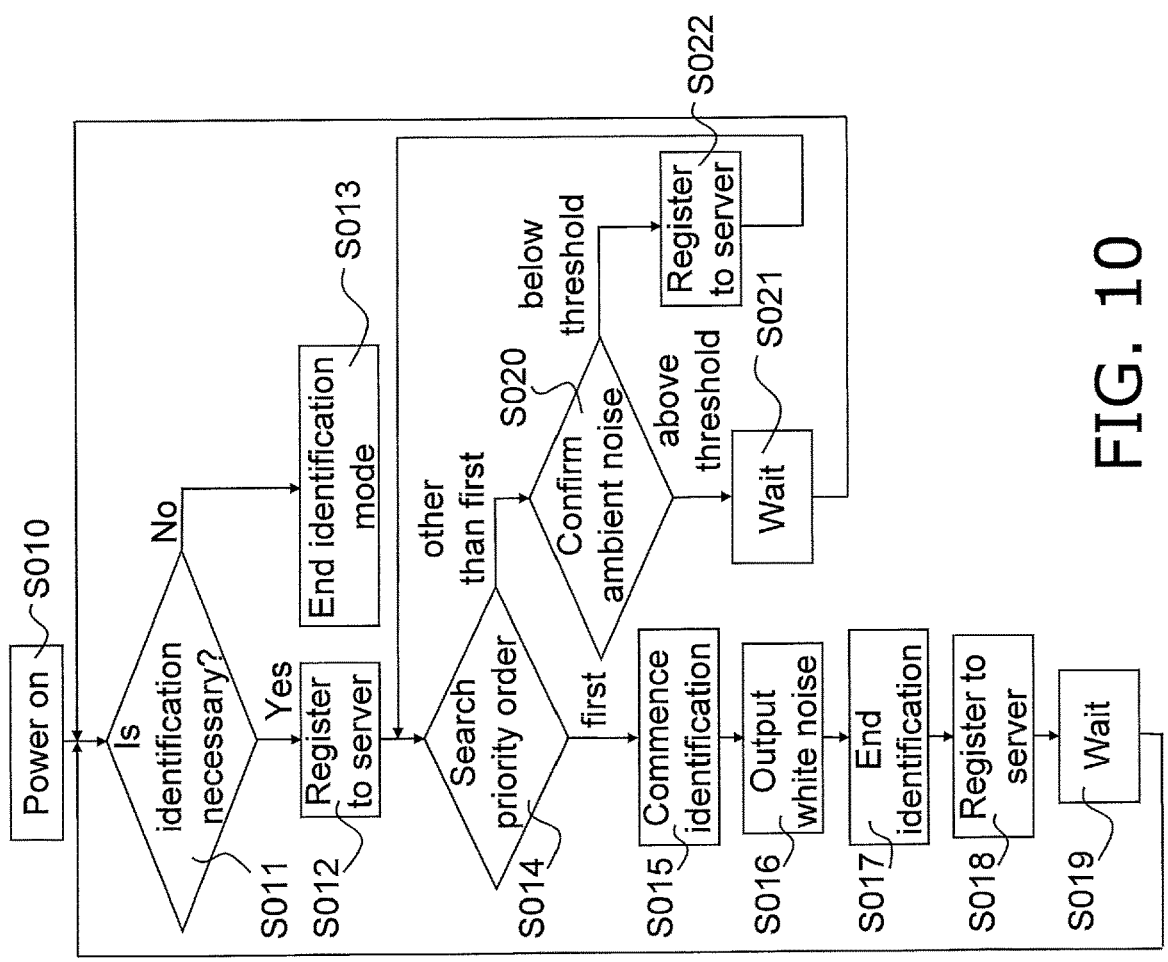
FIG. 10 is a flowchart illustrating an example of the operation of the noise reduction device in a second embodiment of the present disclosure.
Figure 13:
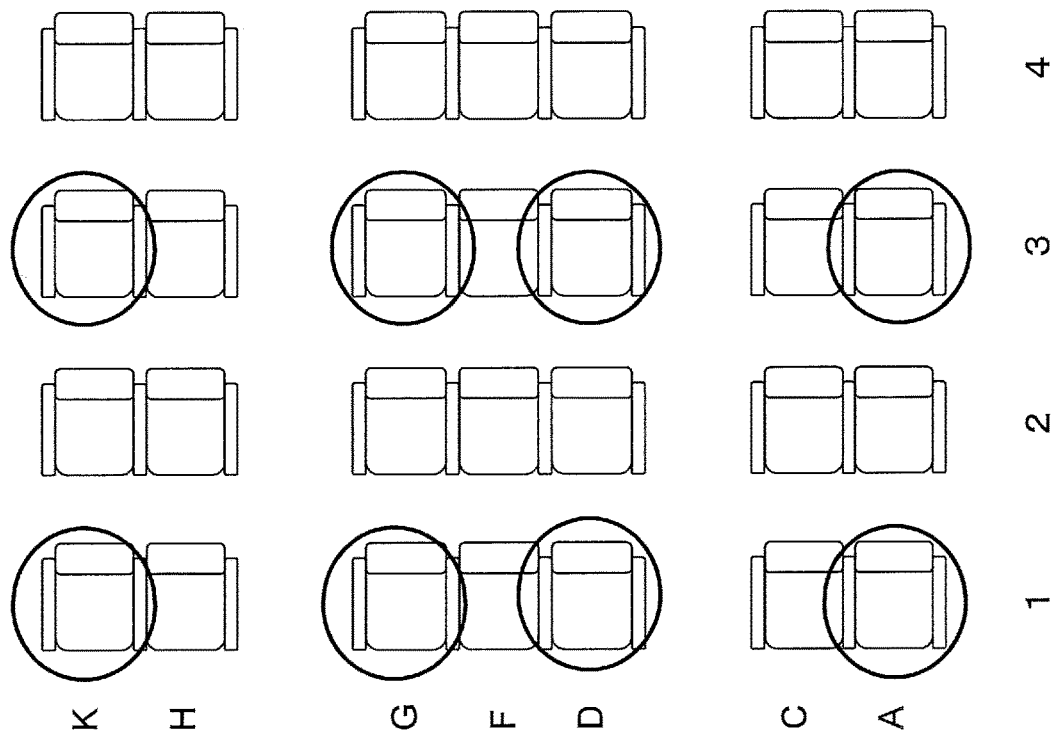
FIG. 13 is a diagram illustrating the seat arrangement in which the devices are installed, and seats in which is installed a noise reduction device in which an identification operation is in progress at a specific timing.

FIG. 10 is a flowchart illustrating an operation example of the noise reduction device in Embodiment 2 of the present disclosure.

In this embodiment, a plurality of noise reduction devices are installed in each seat of an aircraft to constitute a noise reduction system.

Figure 11:
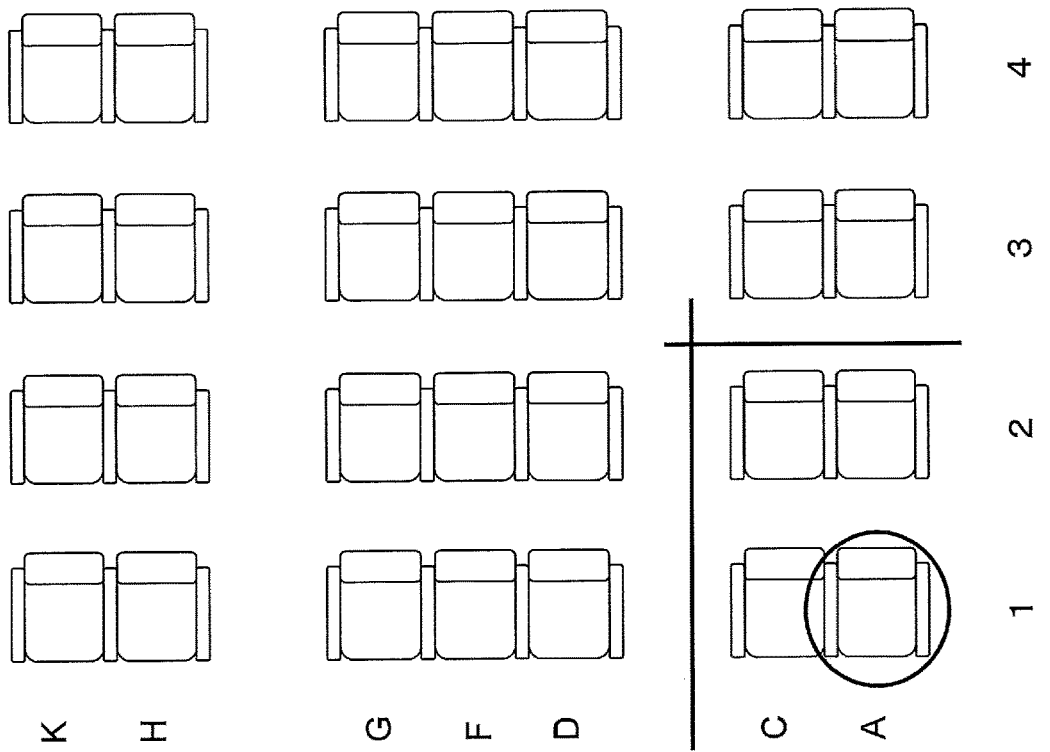
FIG. 11 is a diagram illustrating the seat arrangement in which the devices are installed, and a seat in which is installed a noise reduction device in which an identification operation is in progress at a specific timing.

In this flowchart, the operation at each seat is illustrated in an example in which information between the plurality of seats shown in FIG. 11 is managed by a server (system management device; not shown). In FIG. 11, the seats are numbered from rows one to four from front to rear, and the lines of seats are lettered line A, line C, . . . , line K from left to right. For example, the left-front seat is called seat 1A, and the seat in row 2 and line H is called seat 2H. The steps of the flowchart shown in FIG. 10 will be described below.

When the power to the noise reduction device is turned on, the flow proceeds from step S010 to step S011. In step S011, it is determined whether or not identification is necessary. In this selection method, for example, it may be determined that identification is necessary upon initial startup, or it may be determined that identification is necessary according at some regular interval indicated by a server, such as once a month, for example. the identification is unnecessary, the flow proceeds to step S013 and the processing is ended.

If identification is required, the flow proceeds to step S012, and the seat number where identification is necessary is registered in the server. The priority order is searched in step S014 from among the seats determined to require identification, and if the priority order is first, then identification is commenced in step S015.

The priority is set as follows, for example. When the seat arrangement is as shown in FIG. 11, the priority order is assigned so that seat 1A has the first priority, and then the seats in line A and rows 2 and 3 have the next highest priority. After line A, line C is given the next highest priority, and so on the seat with the lowest priority, which is seat 4K.

When identification is commenced in step S015, white noise is outputted and identification is performed in step S016.

Next, in step S017, identification is ended and information to the effect that the identification has ended is registered in step S018 in the server.

Step S019 involves waiting until it is next determined whether or not identification is necessary in step S011. For example, it is a step in which time adjustment is performed, such as when all of the noise reduction devices that are registered in the server as needing identification have completed identification one time.

In step S014, if the priority order is other than first, the ambient noise is checked, and if the level is below the threshold, the seat number is registered in the server in step S022, and the flow returns to step S014.

In step S014, if the priority order is first among the seat numbers below the threshold, identification is commenced in step S015. The operation after the start of identification is the same as described above.

If the level of the ambient noise is above the threshold, in step S021 the flow returns to step S011 after the waiting time for adjusting the identification time as in step S019.

FIG. 11 is a simplified diagram illustrating the order of identification according to the flowchart in FIG. 10. In this example, we will describe a case in which identification is needed for all the seats, with the threshold being exceeded next to seats outputting white noise, and the level being below the threshold value otherwise.

Figure 12:
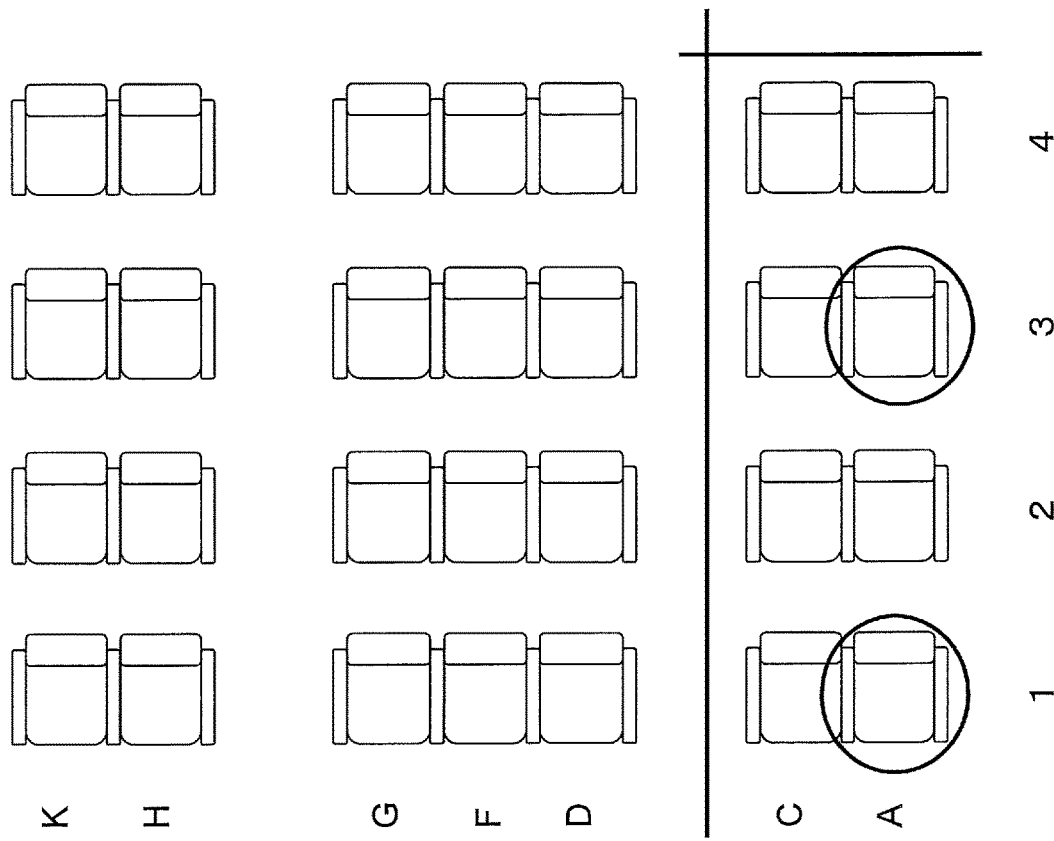
FIG. 12 is a diagram illustrating the seat arrangement in which the devices are installed, and seats in which is installed a noise reduction device in which an identification operation is in progress at a specific timing.
Figure 15:
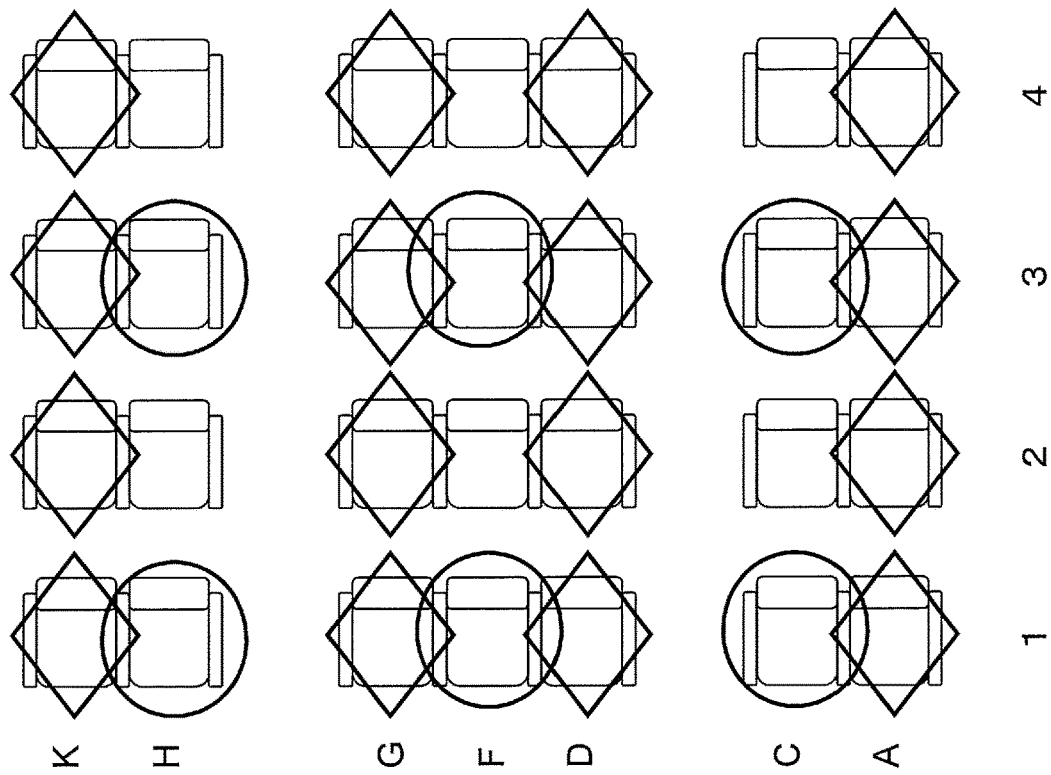
FIG. 15 is a diagram illustrating the seat arrangement in which the devices are installed, and seats in which is installed a noise reduction device in which an identification operation is in progress at a specific timing.

First, seat 1A with the highest priority order starts identification and outputs white noise (indicated by a circle in FIG. 11). Seat 3A with the next highest priority then begins identification. When the time difference between the start of the identification at seat 1A and the start of the identification at seat 3A is sufficiently short compared to the identification time, the circled seat in FIG. 12 is in a state of performing identification at the same time. Likewise, the circles in FIG. 13 indicate that identification is being performed at about the same time.

Figure 14:
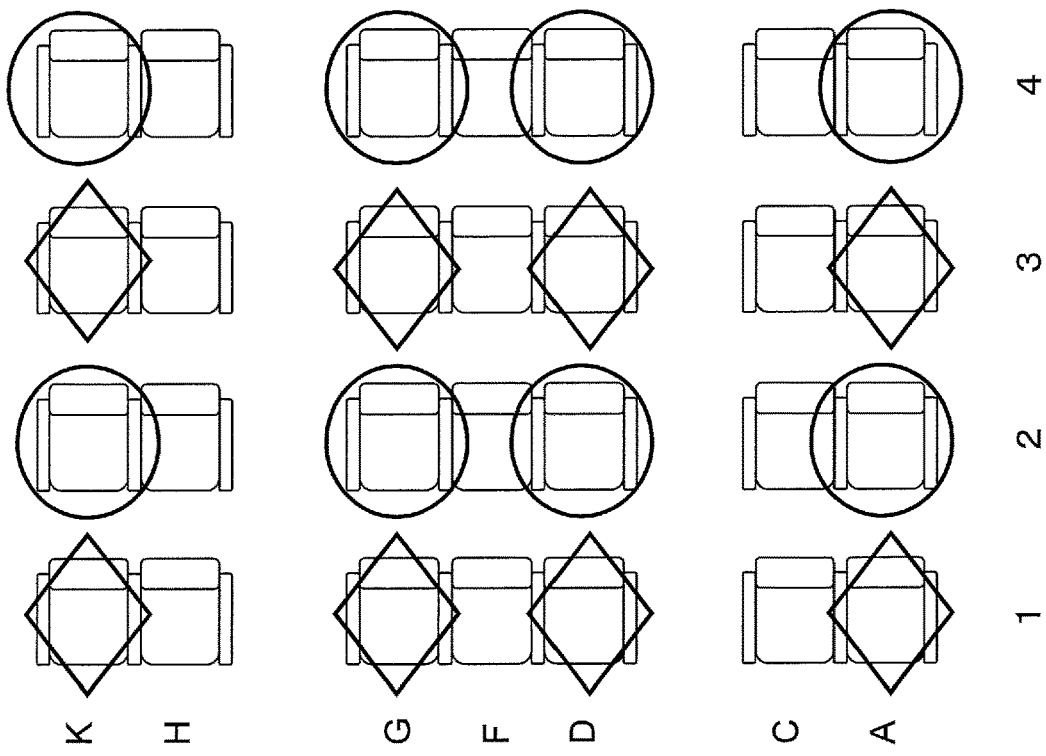
FIG. 14 is a diagram illustrating the seat arrangement in which the devices are installed, and seats in which is installed a noise reduction device in which an identification operation is in progress at a specific timing.
Figure 17:
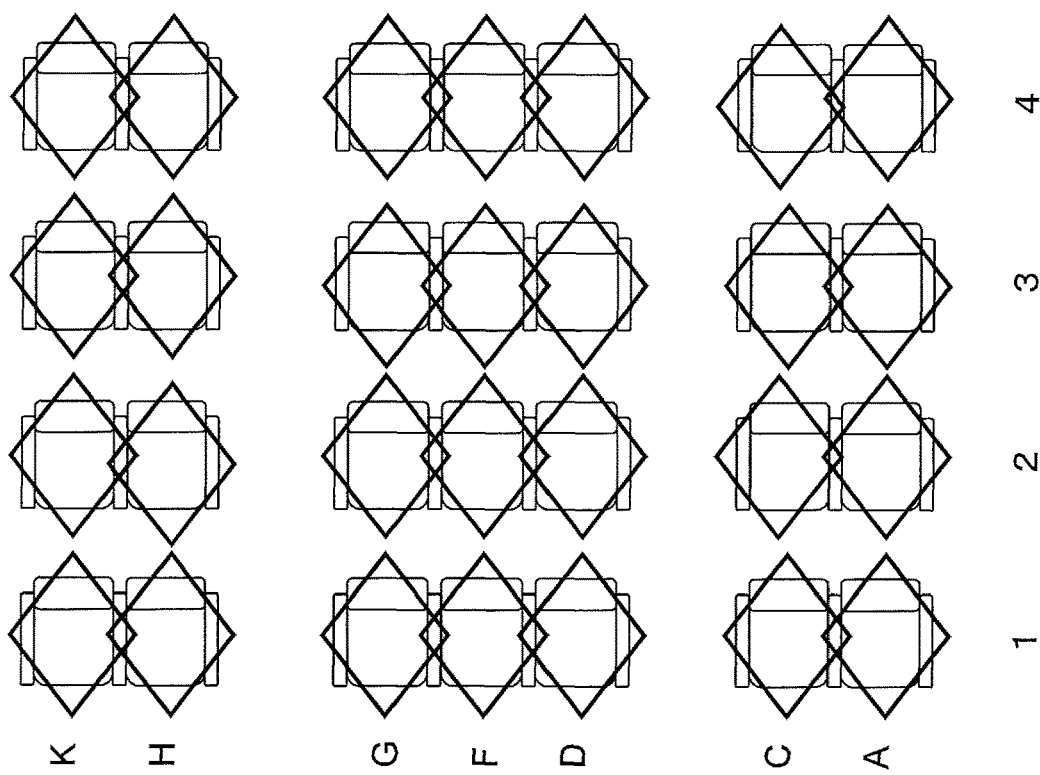
FIG. 17 is a diagram illustrating the seat arrangement in which the devices are installed, and seats in which is installed a noise reduction device in which an identification operation is in progress at a specific timing.
Figure 16:
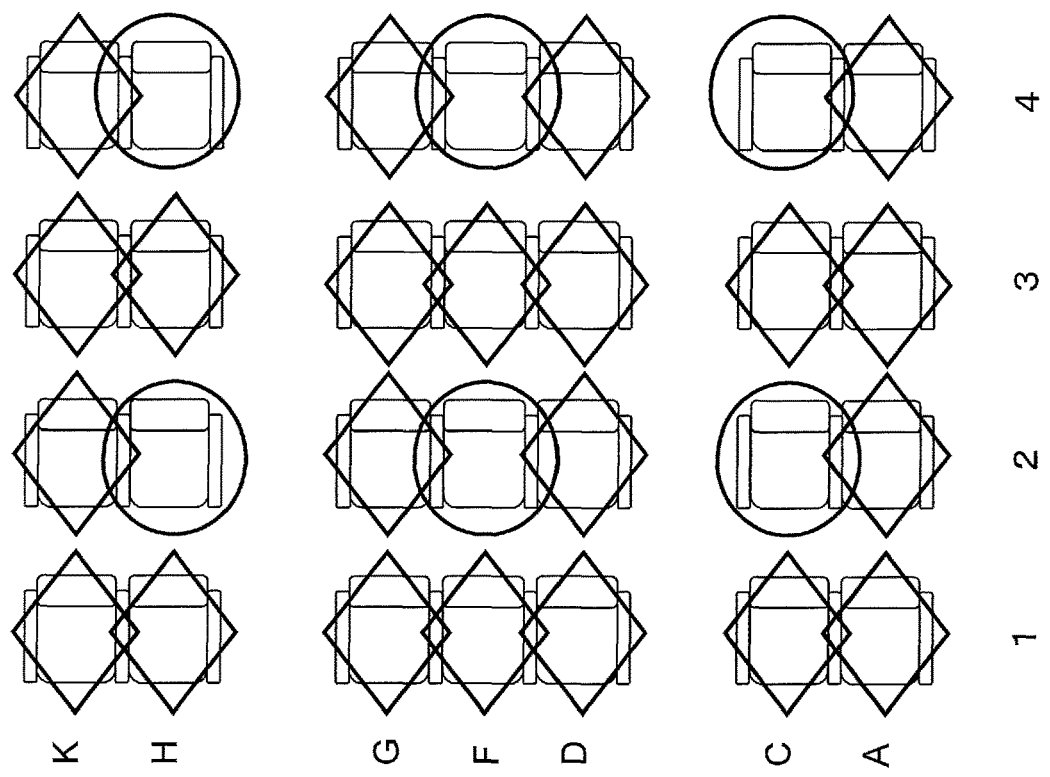
FIG. 16 is a diagram illustrating the seat arrangement in which the devices are installed, and seats in which is installed a noise reduction device in which an identification operation is in progress at a specific timing.

In FIG. 14 and subsequent drawings, seats where identification has already been completed are indicated by diamond-shaped marks. The circles in FIG. 14 indicate seats to be identified next at the same time, and from there, identification is performed simultaneously for the circled seats in FIG. 15 and then for the circled seats in FIG. 16, at which point the identification of all the seats is ended (FIG. 17).

For example, if the time required for identification is 5 minutes and the time difference between the seats that perform identification at the same time is 10 seconds, the waiting time in steps S019 and S021 should be set to the shortest time of 5 minutes and 10 seconds from the start time at which the priority order is first.

With this embodiment, it is determined whether or not a threshold is exceeded only at the start of identification. Accordingly, the influence of white noise from other seats after identification has started is not taken into account. However, since the relation between the control speaker and the error microphone is usually constant at each seat, if seat 3A where the influence of white noise from seat 1A is below the threshold outputs white noise, for example, the white noise of seat 3A will not rise above the threshold of seat 1A, and the influence will be small.

However, when it is desired to ensure a threshold of 20 dB or more at which white noise from other seats enters the error microphone as compared to the level at which white noise of identification of the seat in question enters the error microphone, for example, the threshold may be set to 23 dB or the like to provide a some leeway.

Also, when the relation between the control speaker and the error microphone differs greatly from one seat to the next, there is a possibility that white noise from other seats will have an effect after the start of identification. In that case, the configuration may be such that even after the identification has commenced, the threshold at the seat in question when white noise from another seat starts is measured again, and if the seat in question exceeds the threshold, identification at the other seat is canceled. When identification is cancelled, it is again better to set the same waiting time as in step S019 or step S021 until determination of whether or not the next identification is necessary (step S011).

Thus, in an environment in which a plurality of noise reduction devices are installed, this prevents white noise generated during identification by other noise reduction devices from being inputted to the error microphone, which would adversely affect the accuracy of the FIR filtering of the transfer function corrector, and for a noise reduction device in which white noise due to the identification operation of other noise reduction devices is below the threshold, the identification operation can be carried out simultaneously, so the identification operation will take less time.

In the above description, an example was given in which the identification sound used for identification was white noise, but white noise is not the only option, and the sound may instead be pink noise or the like, for example.

Also, identification sounds with a limited frequency band may be generated and identified with a temporal shift. In this case, the threshold can be set by determining just the sound of the same frequency band as the frequency band of the identification sound outputted from the seat in question.

Figure 18:
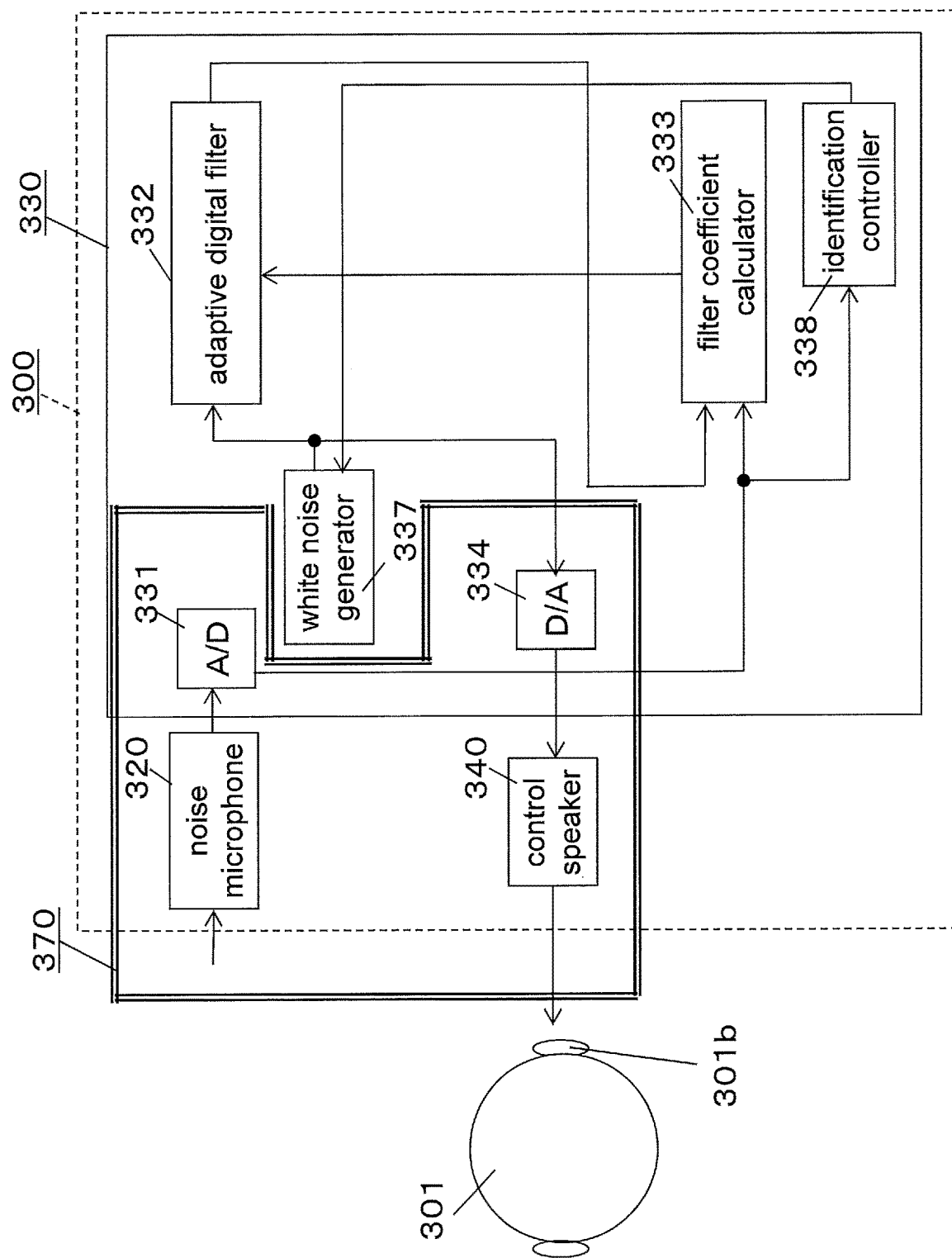
FIG. 18 is a block diagram of the configuration when identifying a noise microphone of the device.

An example of performing identification over the range 360 of the transfer function as shown in FIG. 4 was given above, but the same applies to when performing identification over the range 370 of the transfer function in FIG. 18, that is, when performing identification of a noise microphone instead of the error microphone.

If the transfer functions of the control speaker and the noise microphone are found beforehand, then the control sound generated by the control speaker and onboard noise from NS1*a* to NS1*c*, NS2*a* to NS1*c*, and so forth by the noise microphones during the adaptive operation will be collected, but just the onboard noise can be accurately separated and transferred to the A/D converter 331, and it is possible to eliminate the adverse influence of noise reduction caused when control sound enters the noise microphones. The transfer function ranges 360 and 370 may be identified simultaneously.

Also, in the above embodiment, in identifying the transfer function between the control speaker and the error microphone, the ambient noise level is sensed by the error microphone and compared with a threshold, but it is also possible to sense the ambient noise level with the noise microphone.

Conversely, in identifying the transfer function between the control speaker and the noise microphone, the ambient noise level may be sensed with the error microphone and compared with a threshold.

Also, a dedicated microphone for sensing the ambient noise level may be installed.

Also, in the above embodiment, the sensing of the ambient noise level and its comparison with the threshold were done at the point when the identification is commenced, but it may instead be performed during the identification.

Third Embodiment

Figure 19:
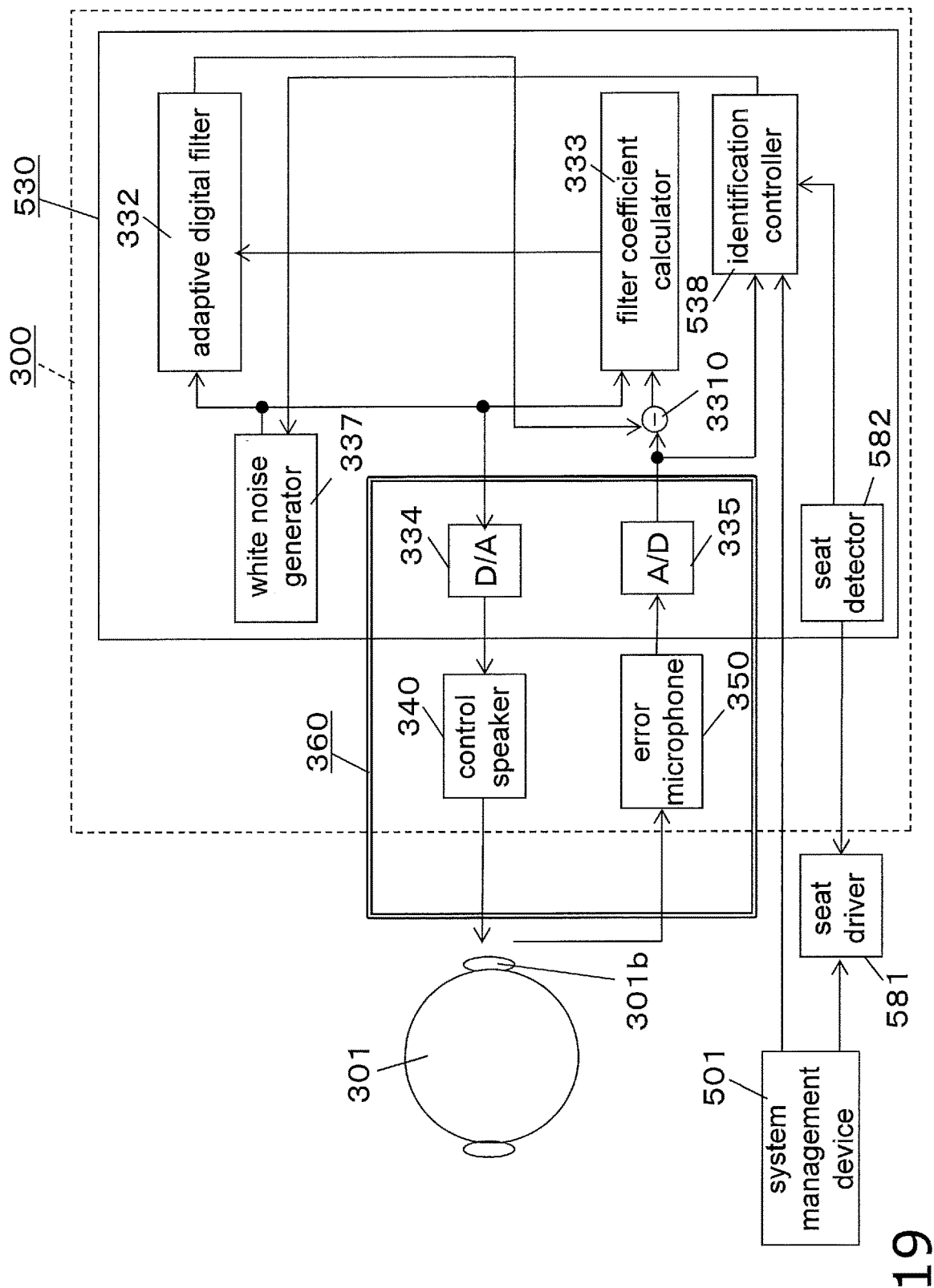
FIG. 19 is a block diagram of a when identification operation is performed with the noise reduction device in an embodiment of the present disclosure.

FIG. 19 is a block diagram showing the basic configuration for performing the identification operation with the noise reduction device in an embodiment of the present disclosure.

In carrying out an identification operation for each noise reduction device, the system management device 501 first notifies the seat driver 581 to create a seat actual usage state in which noise reduction effectively acts at each seat.

For example, if the fully reclined bed mode, in which the seat is reclined horizontally for sleeping, is the actual usage state of noise reduction, the seat driver 581 puts the seat in bed mode.

When the identification operation is commenced at each seat, the identification controller 538 starts the identification operation after the seat detector 582 has detected that the seat is in the actual usage state of noise reduction.

The seat detector 582 may detect that a seat has been fully reclined and is in the bed mode position, or may detect that the sound made by driving the seat has stopped, or may ask the seat driver about the position of a seat.

The identification operation is the same in Embodiments 1 and 2.

That is, during identification operation, the identification controller 538 can be configured to have the same function as the identification controller 338 in FIG. 4 within the noise controller 530. Also, the white noise generator 337 serving as an identification sound generator can be constituted by the same components as in FIG. 4.

The adaptive digital filter 332, the filter coefficient calculator 333, the D/A converter 334, the A/D converter 335, the control sound generator (control speaker) 340, and the error detector (error microphone) 350 can be the same components as in FIG. 3. In an identification operation, in order to find the transfer function of the range 360, it is particularly favorable for the components in the range 360 to be the same as those in FIG. 3.

During an identification operation, the noise controller 530 outputs the output of the white noise generator 337 as identification sound through the D/A converter 334.

Here, the difference between the signal obtained by A/D conversion of the input from the error microphone 350 and the output of the adaptive digital filter 332 is found by the differentiator 3310, this difference is called an identification difference signal, and the identification difference signal and the output of the white noise generator 337 are inputted to the filter coefficient calculator 333.

The filter coefficient calculator 333 calculates a filter coefficient so as to minimize the identification differential signal, and changes the coefficient of the adaptive digital filter 332.

This operation allows an FIR filter expressing the transfer function of the transfer function range 360 to be calculated.

The seat detector 582 may detect that there is no one in a seat. If a person is in the seat and the seat is unintentionally driven, this can lead to safety issues, such as the person being caught in the seat or the posture of the person being changed. The seat detector 582 for detecting the reclining state of the seat and sensing ambient sound can also determine at the same time that no one is there, either through a built-in function or by using camera images.

Also, because of these safety issues, it should not be possible to drive the seat from outside the seat, and therefore the seat detector 582 may notify the seat driver 581 to drive the seat.

With an onboard network such as Ethernet, there is a possibility that all of the devices can end up being controlled by IP communication, so it is important to drive the seats by using a secure Ethernet communication such as an in-seat local network, or RS485 communication, which is closed connection communication within a seat.

Since there is a possibility that the acoustic space will be disturbed if someone is in the seat, this detection makes it possible to more accurately perform the self-check of the noise reduction device and calculate the acoustic transfer function.

Also, the seat detector 582 may detect that maintenance is in progress, that is, that normal service when passenger are boarding the aircraft or sitting in their seats is not in progress. Consequently, during normal service, it is possible to reliably prevent a safety issue in which a seat is unintentionally driven.

Figure 20:
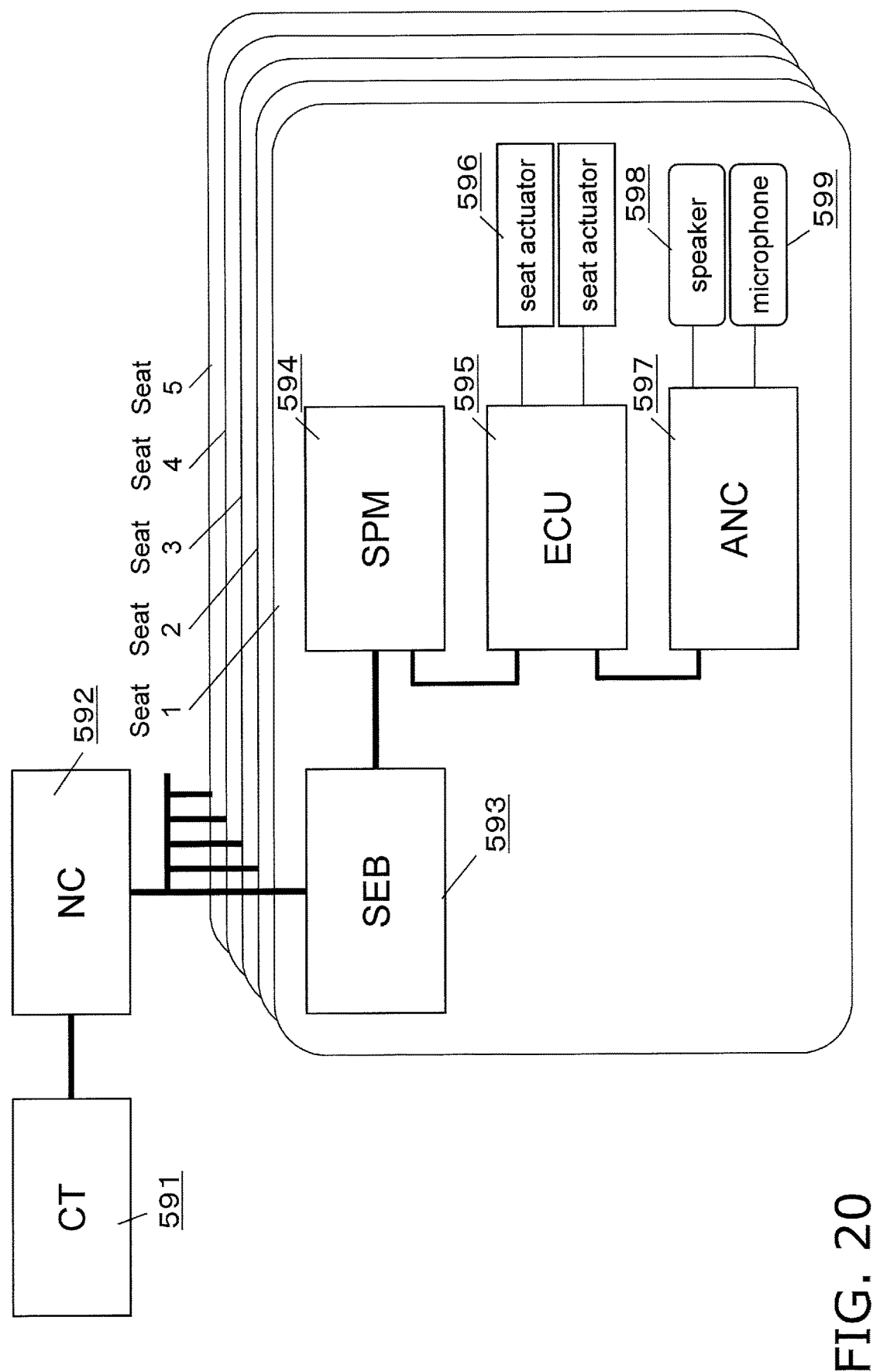
FIG. 20 is a configuration diagram of when identification operation is performed with the noise reduction system in an embodiment of the present disclosure.

FIG. 20 shows an example of the device configuration when the noise reduction system in an embodiment of the present disclosure performs an identification operation. A maintenance CT (crew terminal) 591 comprises a monitor, an input operation function such as a touch panel or a microphone, and a processing device such as a CPU. With an ordinary CT, cabin attendants and maintenance service engineers use the CT to carry out onboard broadcasting, onboard system operations, and so forth.

Meanwhile, the maintenance CT 591 can perform operation control over the cabin or the seats in which no passengers are seated. The maintenance CT 591 may be the same as the CT installed onboard, or it may be a PC that is brought in during maintenance by an engineer and connected to the onboard system to perform operation control. However, in order to prevent safety issues, operation should be controlled only during maintenance when there are no passengers in the seats.

The maintenance CT 591 is a user interface used by the operator of the system management device 501, and is also tasked with some or all of the functions of the system management device 501.

An NC (network controller) 592 includes a CPU processing device, an Ethernet switch, a data storage device, and the like. The NC 592 provides and controls a communication network between onboard seats and devices. The NC 592 may be tasked with some of the functions of the system management device 501.

An SEB (seat electronics box) 593 comprises a processing device such as a CPU, various input/output devices, a data storage device, and the like. One SEB 593 is provided for each seat or each grouping of a plurality of adjacent seats, and controls and manages devices such as a seat monitor attached to each seat or a grouping of a plurality of seats. The SEB 593 controls communication data between devices, and converts communication protocols. The SEB 593 may be tasked with some of the functions of the system management device 501.

An SPM (seat power module) 594 is equipped with a power supply device and supplies electric power to each device. One SPM 594 is disposed for each SEB 593. The SPM 594 can also mediate communication. An ECU (electronic controller) 595 comprises a processing device such as a CPU and various input/output devices. One ECU 595 is disposed for each SEB 593.

The ECU 595 reclines the seat, moves the footrest up and down, switches the seat lighting on and off and controls dimming, and controls and manages the various functions of the seat. The ECU 595 controls the seat to put it in bed mode, put it in upright mode (in which the backrest fully forward), and so forth, and is tasked with the functions of the seat driver 581.

A seat actuator 596 is disposed at each seat and drives the seat as controlled by the ECU 595.

An ANC (active noise controller) 597 is tasked with the functions of the noise controller 530. One ANC 597 is disposed for each SEB 593.

The speaker 598 is tasked with the functions of the control speaker 340.

A microphone 599 functions as the noise microphone 320 and the error microphone 350.

Although the maintenance CT 591 is depicted as being connected to the NC 592, a port that allows an engineer to connect a maintenance PC is provided to the ordinary CT, so the maintenance CT 591 may be configured to be connected to the ordinary CT.

Also, the maintenance CT 591 may be directly connected to the SEB 593, the ANC 597, or the like. In this case, in addition to local communication within the seat, the operation control is carried out by secure IP communication on the Ethernet to the outside of the seat.

Also, when connected to the onboard system, the maintenance CT 591 may notify one or more of the seat detectors 582 that maintenance is in progress.

For instance, notification may be sent intermittently every 10 seconds, and the ANC 597 or the noise reduction system carries out an identification operation including seat drive only during the period in which this maintenance notification is received and confirmed. When this maintenance notification cannot be confirmed to be received, or when there is a notification that the maintenance has been canceled, the noise reduction system stops the identification operation.

This makes it less likely that a seat will be unintentionally driven, or that noise output will result from self-check or identification operation, which prevents safety issues from arising onboard.

Figure 21:
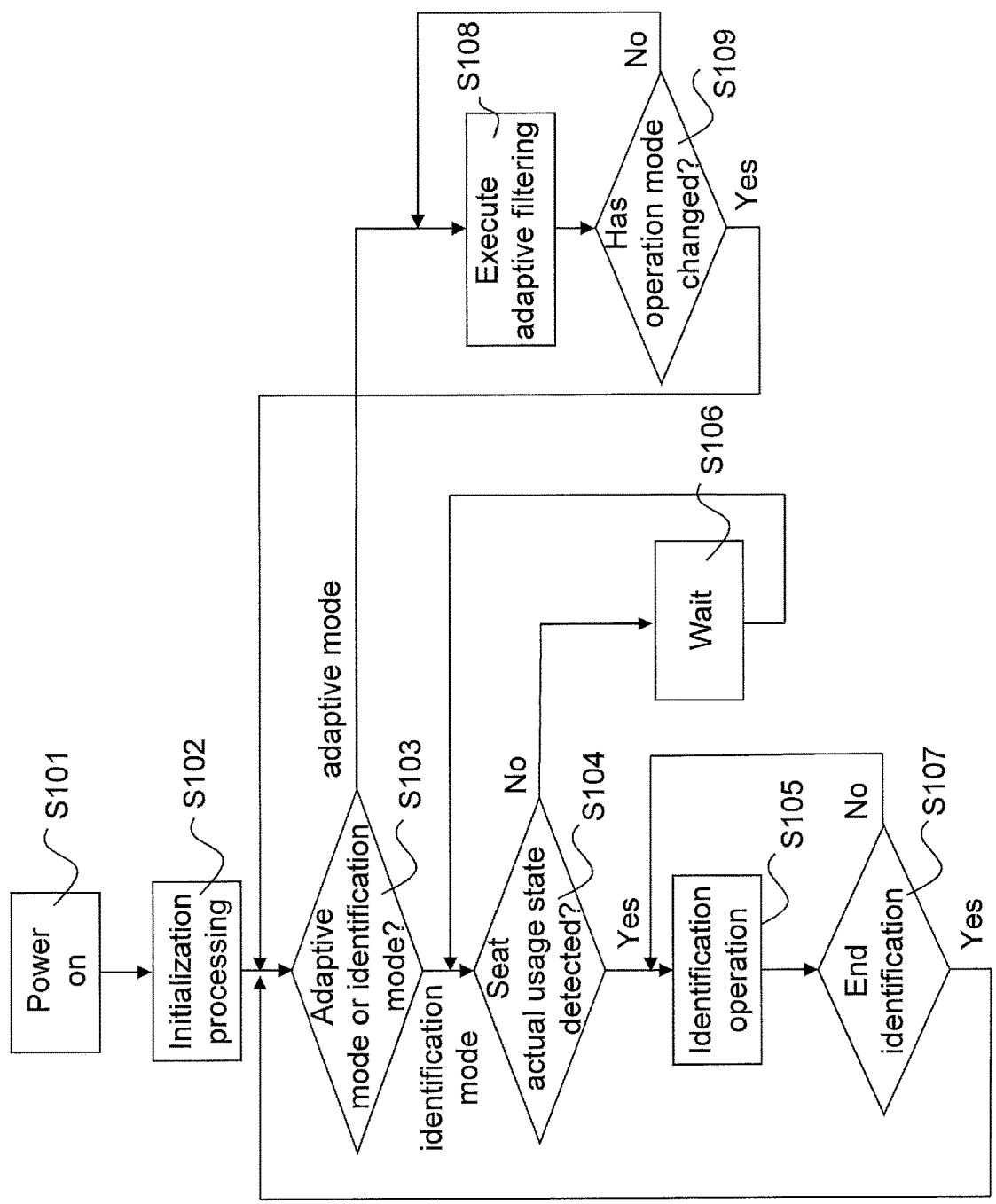
FIG. 21 is a flowchart illustrating an example of the operation of this device.

FIG. 21 is a flowchart illustrating an example of the operation of the noise reduction device in an embodiment of the present disclosure. The steps will be described below.

When the power supply of the noise reduction device is turned on, the flow changes from step S101 to the initialization processing of step S102.

In step S102, power supply to the internal device, initial settings, loading and updating of the operation program, activation completion notification to the management device, and the like are performed.

In step S103, either adaptive mode or identification mode is selected.

If adaptive mode is selected in step S103, adaptive filtering is executed in step S108, the change in the operation mode is monitored in step S109, and the execution of adaptive filtering is repeated as long as the operation mode does not change. When the operation mode changes to identification mode, the flow returns to step S103.

When there is a notification of the start of an identification operation from the system management device 501, identification mode is selected.

When identification mode is selected, in step S104 the seat detector 582 detects whether or not the sheet is in its actual usage state.

The space region in which noise reduction effectively acts needs to be an open space surrounded by the speaker 598, and a space with little equipment that blocks the control sound.

Meanwhile, the shape and wall material of seats on an airplane are designed with passenger comfort in mind, and the seats need to be lightweight and durable while also offering various functionality. For this reason, various devices are efficiently attached within a small space. As a result, when the speaker 598 and the microphone 599 of the noise reduction device are installed in the seat, the inside of the seat is not necessarily a space where the effect of noise reduction can be maximized.

Consequently, in order to effectively reduce noise when a passenger is lying back in the seat, for example, it is conceivable that the speaker 598 and the microphone 599 will be disposed in the seat so as to maximize the noise reduction space with little equipment that will block the sound, when the seat is in the fully reclined bed mode position.

In this case, the actual usage state of noise reduction of the seat may be stipulated to be the bed mode.

Another example of the actual usage state is a state in which all of the opening and closing partitions and doors in the seat are closed, or a state in which there is a hemispherical open space that partially covers the area around the passenger's head that is subject to noise reduction.

In starting the identification operation in step S105 of the noise reduction device after driving the seat to bed mode, in step S104 it is detected by the seat position sensor that the driving of the seat has ended. Alternatively, it may be detected by the microphone 599 that the sound of driving the seat has dropped below the level at which it does not become external noise.

With such a configuration, the identification operation can be performed without being affected by the sound of the driven seat becoming external noise.

The sound of a seat being driven may be assumed to come not only from that seat but also from adjacent seats. When a seat is in its actual usage state, the flow proceeds to step S105 of the identification operation.

If the seat is not in its actual usage state in step S104, the flow goes on to step S106, which is a waiting state. The waiting time in step S106 is set, for example, to how long the noise reduction device outputs the identification sound.

In step S105, identification sound such as white noise is generated to execute the identification operation, and steps S105 and S107 are repeated until the identification operation comes to an end.

How long the identification sound is outputted from the speaker 598 may be shorter than the time required for the identification operation. If the identification sound is emitted for one second, for example, and the identification operation is performed by repeatedly using the one second of sound inputted to the microphone 599 for 10 seconds, the identification sound of an adjacent noise reduction device that becomes external noise will be shortened from 10 seconds to one second.

This allows the time it takes to perform the identification operation of a system including many noise reduction devices to be shortened without being affected by the identification sound from other noise reduction devices during the identification operation.

Figure 22:
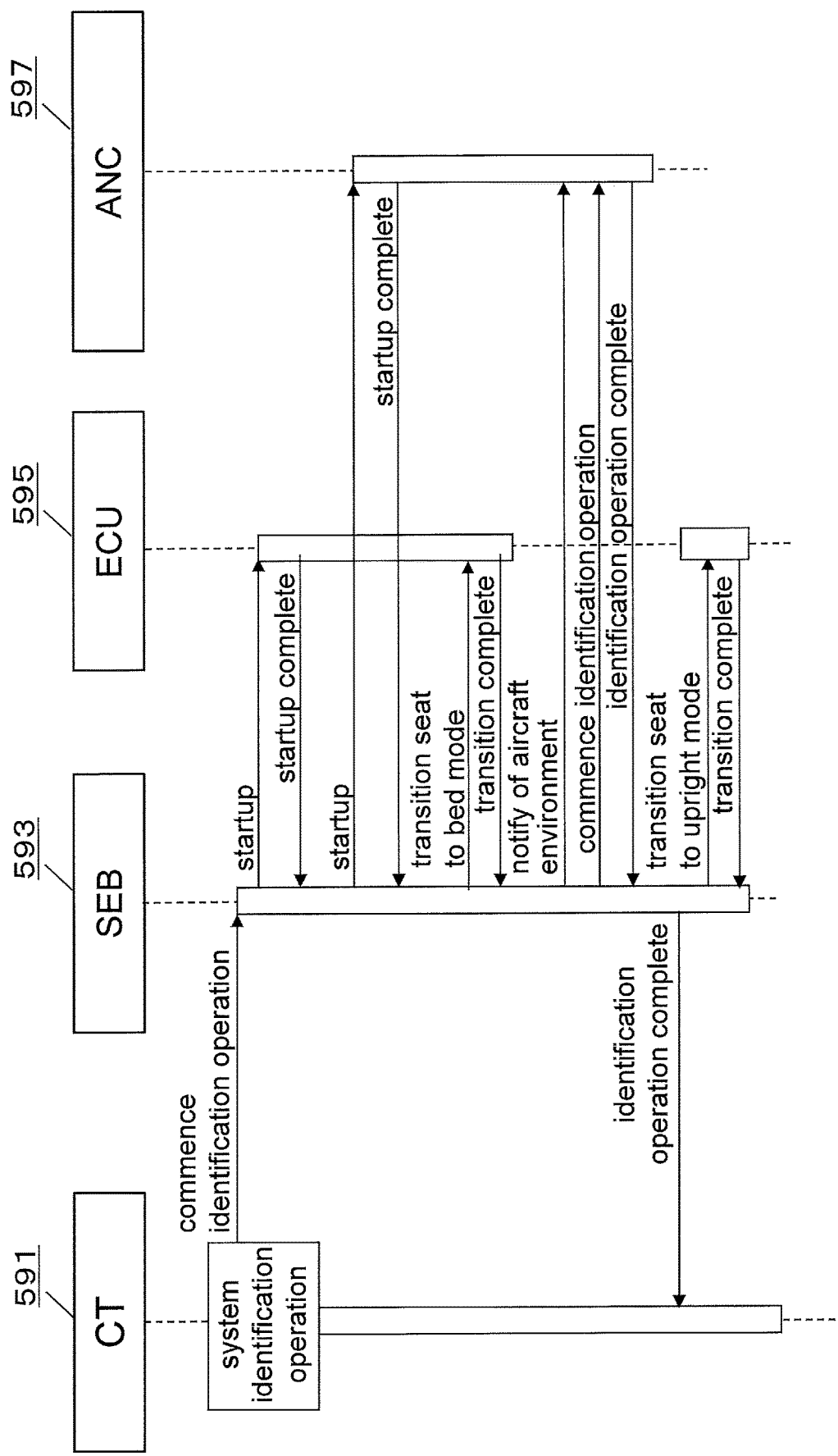
FIG. 22 is a sequence diagram illustrating an example of the operation of this system.

FIG. 22 is a sequence diagram illustrating an example of the operation of the noise reduction system in an embodiment of the present disclosure.

The maintenance CT 591 sends a notification of the start of an identification operation of the noise reduction system to some or all of the seats in the aircraft. More specifically, the maintenance CT 591 notifies the connected SEBs 593 of the start of the identification operation. The notification may be given only to the SEBs 593 corresponding to seats where an ANC 597 is installed. Also, the notification need not be notification of specific instructions, as initial setting processing when various kinds of device are installed in the aircraft.

At each seat, the SEB 593 managing the devices installed in the seat receives a notification of the start of an identification operation from the maintenance CT 591, and sends a command to the ECU 595 and the ANC 597 to start up.

When startup is complete, the ECU 595 and the ANC 597 notify the SEB 593 of the startup completion. After the various devices have started up, the SEB 593 next sends a command to the ECU 595 to put the seat in bed mode.

Upon receiving this command, the ECU 595 drives the seat actuator 596 to put the seat in bed mode. This command designates "Bed Position" with the "Seat Functions" command set forth in the aircraft standards on RS 485 communication, for example.

When the change to bed mode is complete, the ECU 595 notifies the SEB 593 of the completion of the change. After this, information about the aircraft environment (including time and place) is sent from the SEB 593 to the ANC 597 to advise about the environment in which the identification operation will be carried out.

Then, the SEB 593 sends a command to the ANC 597 to perform the identification operation. For this command may use a command to start general-purpose test BITE (built-in test equipment) may be used, or a command of "start identification operation" that explicitly instructs to perform the identification operation may be used.

When the identification operation is complete, the ANC 597 notifies the SEB 593 of the completion of the identification operation.

After the identification operation comes to an end, the SEB 593 notifies the maintenance CT 591 that the identification operation is complete. Furthermore, the SEB 593 may notify the ECU 595 to return the seat to its upright position. When the transition of the seat to its upright position is complete, the ECU 595 notifies the SEB 593 of the completion of this transition.

Figure 23:
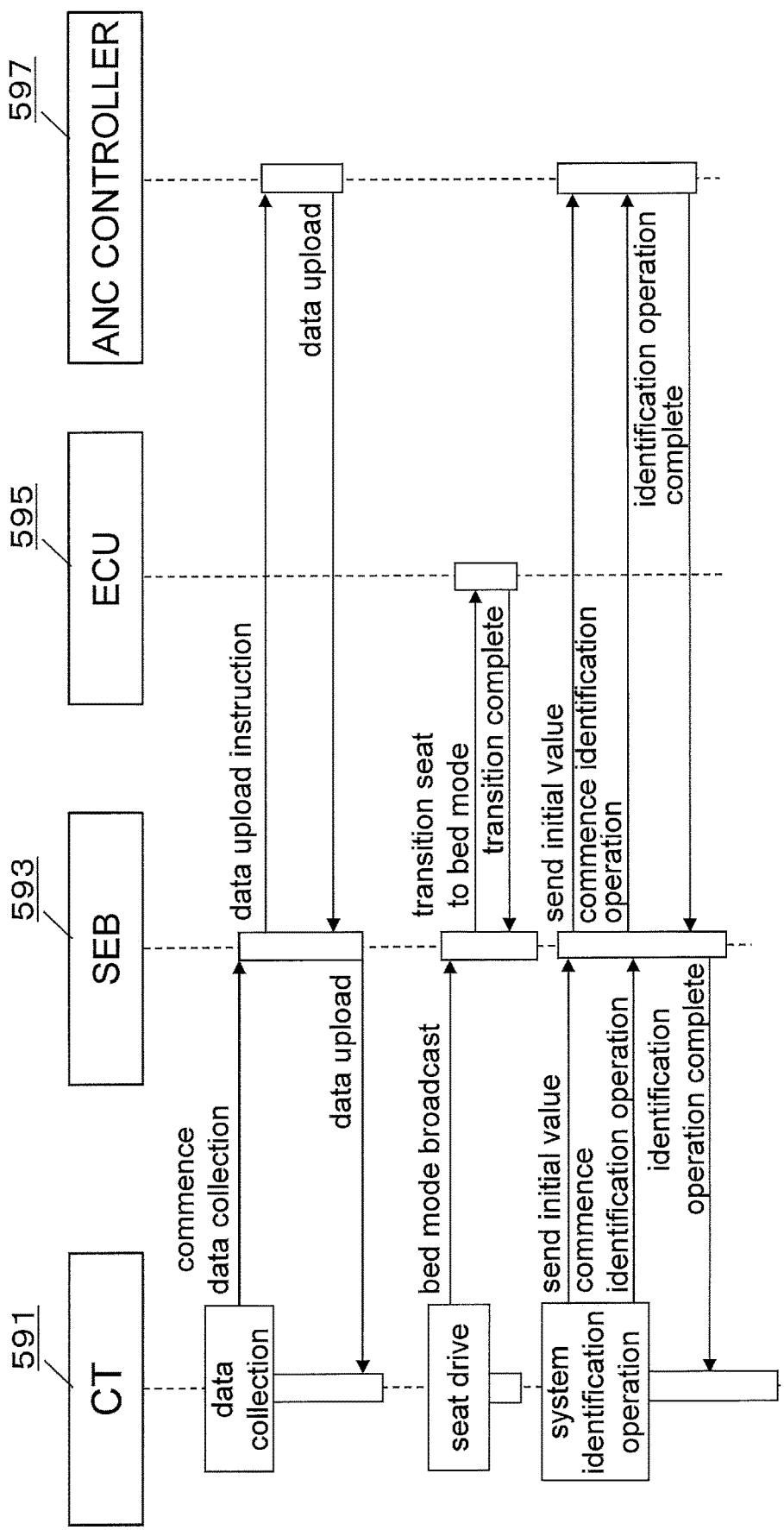
FIG. 23 is a sequence diagram illustrating an example of the operation of this system.

FIG. 23 is a sequence diagram illustrating another example of the operation of the noise reduction system in an embodiment of the present disclosure.

The maintenance CT 591 collects from the ANC 597 the acoustic transfer function determined by the identification operation, the coefficient data of the adaptive filter, and the like. The maintenance CT 591 can generate an initial value of the identification operation based on the collected data, and set this value for another ANC 597.

When carrying out data collection, the maintenance CT 591 notifies the SEBs 593 corresponding to some or all of the seats in the aircraft of the start of data collection. Upon notification of the start of data collection, the SEB 593 sends a command of "data upload instruction" to the ANC 597 to upload the data.

The ANC 597 uploads the acoustic transfer function and the coefficient data of the adaptive filter to the SEB 593.

The SEB 593 uploads this data to the maintenance CT 591. The uploaded data may also be noise data recorded in advance while the airplane was in actual flight operation.

Extracting coefficient data and noise data that have actually been used allows the data to be utilized more effectively, such as by improving the performance effect by analyzing the noise reduction in a system outside the airplane, or applying the data as a probable coefficient initial value to the noise reduction system of another aircraft so that the identification operation can be executed accurately and in less time.

Next, the maintenance CT 591 notifies some or all of the ANCs 597 to put the seats in bed mode. More specifically, the maintenance CT 591 sends a command of "bed mode broadcast" for putting a seat in bed mode to some or all of the SEBs 593.

Upon receiving the command, the SEB 593 sends a command to the ECU 595 to put the seat in bed mode, and the ECU 595 drives the seat actuator 596 to put the seat in bed mode.

When the transition to bed mode is complete, the ECU 595 notifies the SEB 593 of the completion of this transition. The maintenance CT 591 may send the command "bed mode broadcast" for putting the seat in bed mode such that the timing divided up into groups of a plurality of seats.

For example, seat group units having similar acoustic transfer functions may be such that the seats are divided into a total of four groups, with the group of first class seats making up one unit and the group of business class seats divided up into three units by cabin partitions, and notification to change to bed mode is sent out in group units, starting from the first row of seats and going to the last row of seats, in order, at regular time intervals.

This method makes it possible to disperse the power for driving the seats, and allows the identification operation to be efficiently performed, in order, from the first row of seats to the last row.

However, notification accompanying seat drive should be such that notification is impossible or deactivated during normal flight service because there is a possibility of causing safety issues in which passengers may be caught or their posture changed if there are people in the seats.

For example, seat drive is executed from the interior of the seat by always confirming that there is no safety issue and that maintenance is in progress at the communication entrance of the seat, using secure IP communication by Ethernet outside the seat, and using RS485 communication or local network communication inside the seat.

During normal service, there many different ways to prevent the execution of software that drives the seats, such as using a hardware key known as HASP, and the execution of authentication software, and how this is accomplished is not important here.

Next, when commencing the system identification operation, the maintenance CT 591 sends a command of "initial value transmission" for sending the coefficient data of the acoustic transfer function as the coefficient initial value to the ANC 597.

More specifically, the maintenance CT 591 sends initial values of coefficient data to some or all of the SEBs 593. The initial value of the coefficient data of the acoustic transfer function may be obtained by having the maintenance CT 591 receive ahead of time coefficient data that has actually been used in the noise reduction system provided in another aircraft, and using this as the initial value. Alternatively, the maintenance CT 591 can receive ahead of time coefficient data derived by a computer simulation that simulates the internal equipment and wall material of the seat and the acoustic space in which the speaker 598 and the microphone 599 are disposed, and use this data as an initial value.

Also, not only the coefficient data of the acoustic transfer function derived from the identification operation, but also the initial value of the coefficient data of the adaptive filter used in the adaptive operation may be sent. A more likely adaptive filter can also be applied in an adaptive operation in which noise reduction is performed on ambient noise using the initial value of more likely coefficient data, which affords a better noise reduction effect.

The SEB 593 sends the initial value of the received coefficient data to the ANC 597.

Also, the initial value of the coefficient data sent between the maintenance CT 591 and the ANC 597 may be compressed before being sent.

For example, since seats disposed one in front of the other usually have similar coefficient data values, compression efficiency can be increased by deriving differential data for the coefficient data of the acoustic transfer function of seats that are near one another from the coefficient data of the acoustic transfer function serving as a base for these seats.

Rather than transmitting data for each individual seat from a plurality of ANCs 597, it is better to transmit only differential data to each individual seat after sharing the base coefficient value, thus reducing data to be transmitted, that is, performing data compression, allowing the data collected by the maintenance CT 591 to be compressed to reduce the data storage capacity, which makes it possible to reduce the work entailed by data collection and the equipment cost.

After sending the initial value of the coefficient data, the maintenance CT 591 sends a command to execute the identification operation to some or all of the SEBs 593.

Upon receiving the command, the SEB 593 sends a command to the ANC 597 to execute the identification operation. When the identification operation is complete, the ANC 597 notifies the SEB 593 of the completion of the identification operation. After the identification operation comes to an end, the SEB 593 notifies the maintenance CT 591 that the identification operation is complete.

FIG. 24 is a diagram showing an example of the structure of the commands communicated in the sequence shown in FIGS. 22 and 23. "Bed mode broadcast" is a command sent from the maintenance CT 591 to a plurality of SEBs 593 when the seats are driven to bed mode.

"Initial value transmission" is a command that is sent when the coefficient initial value is sent from the maintenance CT 591 or the SEB 593 to the ANC 597.

"Identification operation start" is a command that is sent from the SEB 593 to the ANC 597 when notifying to start the identification operation.

"Identification operation complete" is a command that is sent when notifying the SEB 593 from the ANC 597 that the identification operation is complete.

"Data upload instruction" is a command that is sent from the SEB 593 to the ANC 597 when notifying to upload data.

"Data upload" is a command that is sent when data is uploaded from the ANC 597 to the SEB 593, or from the SEB 593 to the maintenance CT 591.

In this example, a command in the communication protocol RS 485 is described, but communication between the devices can also be accomplished by using the Ethernet communication protocol IP or a command replaced by USB communication. Using a standard communication method allows many different types of device in the aircraft to be connected, so the noise reduction device can be developed and applied to more models at low cost.

INDUSTRIAL APPLICABILITY

The noise reduction device and the noise reduction system disclosed herein can provide a high-quality noise reduction device. Therefore, the present disclosure can be applied as a noise reduction device to be used in usage spaces requiring a high level of comfort in a complicated noise environment such as that in an aircraft, a train, a car, or the like.

REFERENCE SIGNS LIST

100 aircraft
100*a*, A, B, C cabin
101*a*, 101*b* wing
102*a*, 102*b* engine
104, 501 system management apparatus
105, 402 seat (control space)
300 noise reduction device
301, 401 user
401*a* head (control center)
301*b*, 401*b* ear
310, 410, NS1*a*, NS1*b*, NS1*c*, NS2*a*, NS2*b*, NS2*c*, NS2*d*, NS2*e* noise source
320 noise microphone
330, 430, 530 noise controller
331, 335 A/D converter
332 adaptive digital filter
333 filter coefficient calculator
334 D/A converter
336 transfer function correction unit
337 white noise generator
338, 538 identification control section
339, 339*a*, 339*b*, 339*c*, 339*d* switch
3310 differentiator
340 control speaker
350, 450*a*, 450*b* error microphone
360, 370 range
402*a* shell portion
402*aa* shelf portion
402*b* seat portion
402*ba* seat bottom
402*bc* headrest
402*bd*, 402*be* armrest
420*a*, 420*b*, 420*c*, 420*d*, 420*e*, 420*f*, 420*g* noise microphone
440*a*, 440*b* control speaker
581 seat driver
582 seat detector
591 maintenance CT (crew terminal)
592 NC (network controller)
593 SEB (seat electronics box)
594 seat power module (SPM)
595 ECU (electronic control unit)
596 seat actuator
597 ANC
598 speaker
599 microphone

The invention claimed is:

1. A noise reduction system comprising:
a plurality of noise reduction devices each comprising:
  a noise detection section configured to detect noise;
  a noise control section configured to generate a control sound signal for reducing the noise detected by the noise detection section at a control center of a control space inside a seat;
  a control sound output section configured to output a control sound on the basis of the control sound signal from the noise control section;
  an error sound detection section configured to detect an error sound by superimposing the noise at the control center with the control sound outputted from the control sound output section; and
  a seat detection section configured to detect that a seat is in an actual usage state for noise reduction,
  wherein:
    the noise control section has an identification sound generation section and an identification control section,
    identifying an acoustic transfer function that includes a path from the control sound output section to the error sound detection section or the noise detection section by outputting an identification sound from the control sound output section and detecting the identification sound with the error sound detection section or the noise detection section, and
    the identification control section is configured to identify the acoustic transfer function by generating the identification sound from the identification sound generation section when the seat detection section has detected that the seat is in the actual usage state for noise reduction, and
a system management device configured to manage how the plurality of noise reduction devices perform the identification of the acoustic transfer function,
wherein the system management device is further configured to notify a seat driver for driving the seat to drive the seat having a noise reduction device so as to put the seat in its actual usage state, starts the identification of the noise reduction devices included in the noise reduction system, and in the system management device, it is registered that identification has been executed.

2. The noise reduction system according to claim 1, wherein the seat detection section is configured to detect that there is no person in the seat on the basis of a reclining state of the seat, ambient sound, or camera images.

3. The noise reduction system according to claim 1, wherein the system management device includes a maintenance crew terminal section configured to drive and control an onboard system or the seat that maintenance is in progress on during maintenance of the onboard system by an engineer when no passenger is in the seat, and the maintenance crew terminal section notify the noise reduction device that maintenance is in progress.

\* \* \* \* \*